United States Patent [19]
Cantwell

[11] Patent Number: 5,117,232
[45] Date of Patent: May 26, 1992

[54] GLOBAL SYSTEM POSITIONING RECEIVER

[75] Inventor: Robert H. Cantwell, Sudbury, Mass.

[73] Assignee: Raytheon Company, Lexington, Mass.

[21] Appl. No.: 692,828

[22] Filed: Apr. 26, 1991

Related U.S. Application Data

[63] Continuation of Ser. No. 532,834, Jun. 4, 1990, abandoned.

[51] Int. Cl.[5] .................. H04B 7/185; G01S 5/02
[52] U.S. Cl. .................................................. 342/357
[58] Field of Search .................. 342/357, 380; 375/1

[56] References Cited

U.S. PATENT DOCUMENTS

| | | | |
|---|---|---|---|
| 4,426,712 | 1/1984 | Gorski-Popiel | 375/96 |
| 4,701,934 | 10/1987 | Jasper | 342/357 |
| 4,734,701 | 3/1988 | Grobert | 342/380 |

*Primary Examiner*—Theodore M. Blum
*Attorney, Agent, or Firm*—Walter F. Dawson; Richard M. Sharkansky

[57] ABSTRACT

An apparatus and method for pseudo-random noise (PN) code correlation in a GPS receiver employing sign and magnitude input weighting for each of the in-phase (I) and quadrature-phase (Q) samples of a received PN-code modulated carrier. A programmable R factor provides input A/D sample sign and magnitude weighting control of outside crossing samples for interference rejection of other RF signals interfering with the received PN-code modulated RF carrier. The R factor weighting determines if the A/D samples are from a linear or adaptive A/D converter. In-phase reference (IREF) signals and quadrature-phase reference (QREF) signals, produced by an internally generated PN-code reference, are provided to a plurality of I and Q multi-Y-tap correlator/integrators for correlation with the I and Q samples. The apparatus correlates I and Q samples obtained from IF sampling or baseband sampling of the received PN-code modulated carrier.

46 Claims, 13 Drawing Sheets

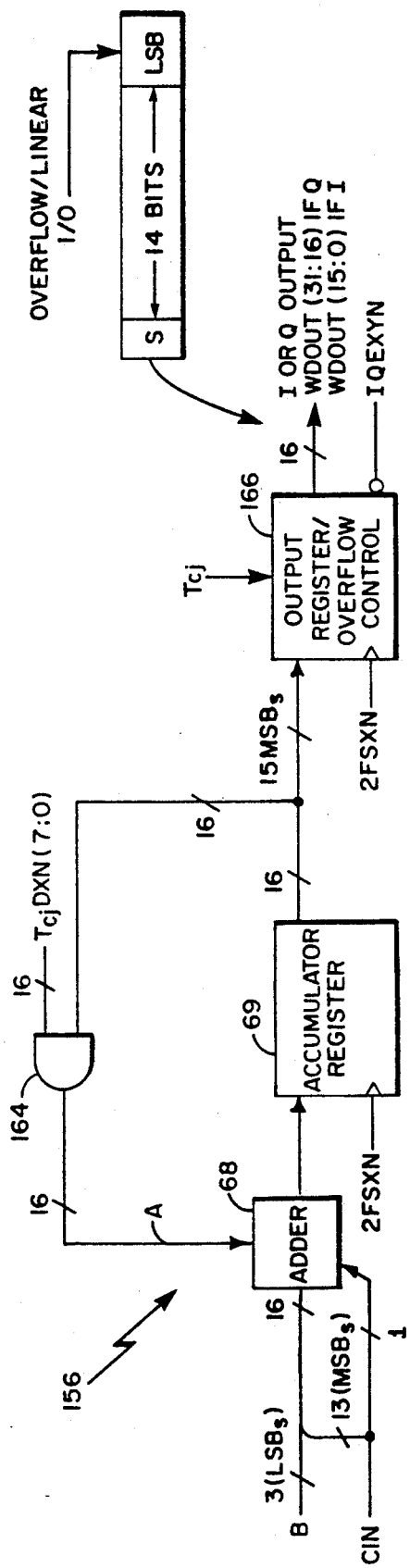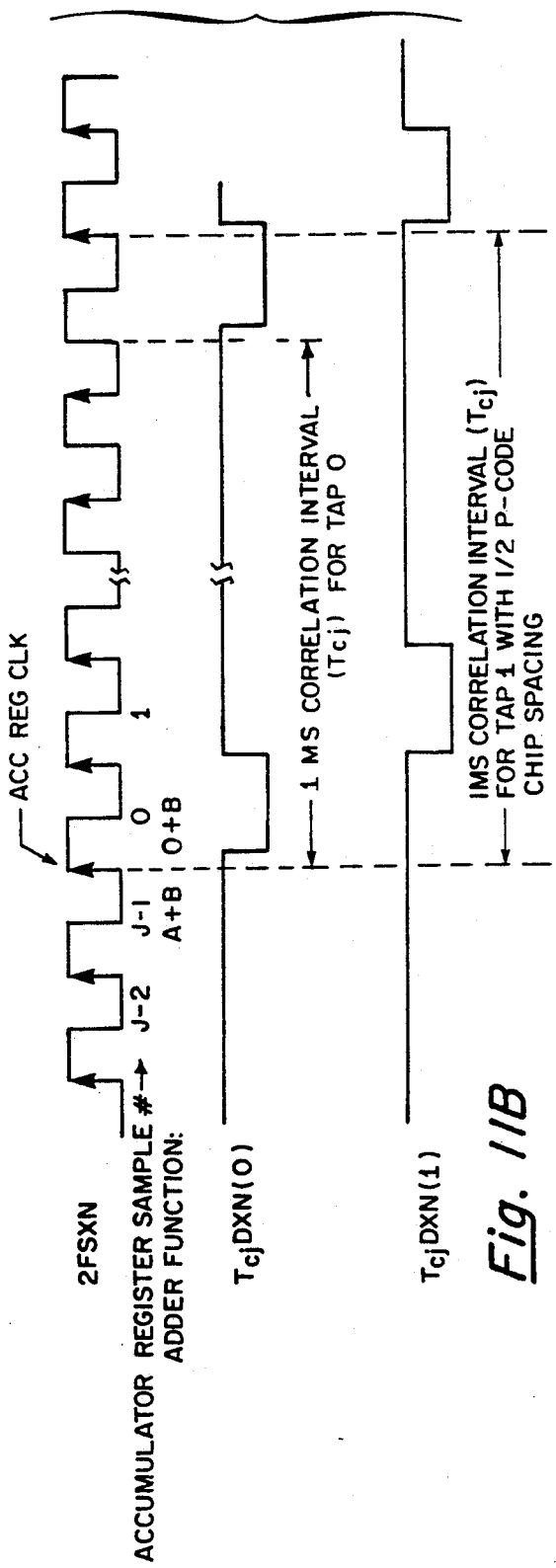
Fig. 11A
Fig. 11B ance with the present invention, as discussed hereinafter.

GLOBAL SYSTEM POSITIONING RECEIVER

This application is a continuation of application Ser. No. 532,834 filed Jun. 4, 1990, now abandoned.

BACKGROUND OF THE INVENTION

This invention relates to digital signal processing for radar and communications using phase code modulation, and in particular to an apparatus and method for correlating Binary Phase-Shift Keying (BPSK) pseudorandom noise (PN) codes in a signal processor of a Global Positioning System (GPS) receiver.

Phase code modulation is ideally suited to measuring time or time delay. The time delay is a measure of range while the difference in phase measurements taken at fixed time intervals is a measure of frequency. The phase code modulation is compared (correlated) with the expected phase or replica of the phase code modulation. Typical phase code modulations include not only Binary Phase-Shift Keying (BPSK), but also Binary Frequency-Shift Keying (BFSK).

The Global Positioning System (GPS) is a navigation system based on eighteen satellites in orbit. When fully operational the eighteen satellites will be evenly dispersed in three, inclined, 12-hour circular orbits chosen to ensure continuous 24-hour coverage. The GPS will provide extremely accurate time and three-dimensional position and velocity information to users anywhere in the world. Normally, four satellites are required for precise location determinmination in four dimensions (latitude, longitude, altitude and time). The location determinations are based on measurement of the transit time of RF signals from the satellites selected from the total of eighteen. Each satellite transmits a different pair of L-band carrier signals including an L1 signal at 1575.42 MHz and an L2 signal at 1227.6 MHz. The L1 and L2 signals are biphase modulated by two pseudo-random noise (PN) codes comprising a P-code which provides for precision measurement of transit time and a C/A (course/acquisition) code which provides for a course measurement of transit time and provides for easy lock-on to the desired signal suitable for many commercial purposes. Since each satellite uses different PN-codes, a signal transmitted by a particular satellite can be selected by generating and matching (correlating) the corresponding PN-code pattern.

The P-code is the principal navigation pseudo-random noise (PN) ranging code of the Global Positioning System. The P-code is a repetitive sequence of bits referred to as chips (in spread spectrum parlance). The P-code for each satellite is the product of two PN-codes X1 and X2 where X1 has a period of 1.5 sec or 15,345,000 chips and X2 has a period of 15,345,037 or 37 chips longer. The P-code generator in a GPS receiver reproduces a replica of the P-code that is generated by a P-code generator of a particular GPS satellite and each satellite produces a unique P-code. The C/A code is a relatively short code of 1023 bits or 1 msec duration at a 1.023 Mbps bit rate. This code is selected to provide good multiple access properties for its period.

An all-digital GPS receiver is described in a paper entitled "All-Digital GPS Receiver Mechanization", by Peter C. Ould and Robert J. Van Wechel, reprinted by the Institute of Navigation, Global Positioning System Papers published in Navigation, Vol. 2, pp. 25–35, (also presented at ION Aerospace Meeting, April, 1981). Code correlation is accomplished digitally using either digital matched filters (DMF) or digital correlators, depending upon performance requirements. In particular, a correlator is described that is a three-sample, 2-bit correlator used for both C/A and P-codes wherein the quantized samples are scaled to produce all positive values so that simple up/down counters can be used to integrate the most significant bit (MSB) and least significant bit (LSB) independently. However, this approach requires one correlator/integrator in the signal processor of the GPS receiver for each analog-to-digital bit. In a subsequent paper entitled "All-Digital GPS Receiver Mechanization-Six Years Later by J. S. Graham, P. C. Ould and R. J. Van Wechel, Journal of Institute of Navigation, National Technical Meeting, January 1987, a multi-tap correlator/integrator is described that is predominantly a set of N times Y 16-bit up/down counters where N is the number of A/D bits and Y is the multiple number of taps. When sampled signals are correlated against a replica of the transmitted code, the counters count up or down to indicate a match or mismatch, respectively for each A/D bit. At the end of the correlation time interval the counts for each A/D bit are stored in holding registers accessible by a microprocessor bus. This integrate and dump function which is the optimal filter requires weighting of each 16-bit up/down counter output. The N 16-bit output weighted words are accumulated for detection of pseudo-random noise code buried in Gaussian noise. However, these approaches for pseudo-random noise code correlation result in considerable hardware even when implemented with VLSI circuitry.

New applications of the GPS system have identified the need for a GPS receiver having a signal processor implemented on a very large scale integrated (VLSI) circuit. In order to accomplish this level of integration, the signal processor has to be designed with minimum circuitry to facilitate implementing it on a VLSI circuit.

SUMMARY OF THE INVENTION

Accordingly, it is therefore an object of this invention to provide a GPS receiver to perform N-bit correlation of a received PN-code modulated carrier with sign and magnitude input weighting.

It is another object of this invention to provide a GPS receiver which performs N-bit correlation of a received PN-code modulated carrier using minimum circuits and interconnections to facilitate very large scale integrated (VLSI) circuit implementation.

It is a further object of this invention to provide a PN-code correlation apparatus for a GPS receiver which generates a PN-code reference to provide both an in-phase reference (IREF) signal and quadrature-phase reference (QREF) signal to enable performing either IF sampling or baseband sampling of the received PN-code modulated carrier.

It is a further object of this invention to provide a multi-channel signal processor wherein each channel comprises a sign and magnitude input weighted correlator for correlating BPSK pseudo-random noise codes.

The objects are further accomplished by a Global Positioning System (GPS) receiver comprising a GPS receiver front end for performing sampling of a received PN-code modulated carrier to generate in-phase (I) and quadrature-phase (Q) samples, a signal processor coupled to outputs of the receiver front end for removing a doppler frequency and PN-code modulation from the modulated carrier, the signal processor comprises a plurality of channels, each of the channels including a correlator means, having sign and magnitude input weighting, for correlating the I and Q samples with in-phase (IREF) and quadrature-phase (QREF) components of an internally generated PN-code reference, the correlator means controlled in response to a weighting select signal, and a GPS processor coupled to the signal processor for processing the correlated I and Q samples to determine the phase of the carrier signals, to provide multi-channel control signals to the signal processor and to estimate a pseudo-range and a pseudo-range rate. The GPS front end receiver comprises either IF sampling or baseband sampling for generating said I and Q samples. For baseband sampling the correlator comprises means for correlating the I and Q samples with only the IREF component of the internally generated PN-code reference. The sign and magnitude input weighting of the correlator comprises register means for storing an R factor weighting input, multiplexor means coupled to the register means for selecting between weighted inside crossings of the samples and weighted outside crossings of the samples in accordance with the weighting select signal, and logic means coupled to the multiplexor for generating the weighting select signal in accordance with sign and magnitude inputs of the samples to the logic means.

The objects are further accomplished by a correlation apparatus comprising means for removing received carrier doppler from in-phase (I) and quadrature-phase (Q) samples of a received pseudo-random noise (PN) code modulated carrier signal, means coupled to the received carrier doppler removing means for generating a PN-code reference which is a replica of the received PN-code, the PN-code reference having an in-phase (IREF) component and a quadrature-phase (QREF) component, and means, coupled to the carrier doppler removing means and the PN-code reference replica generating means, for correlating the I and Q samples with the IREF and QREF components respectively of the replicated PN-code. The correlating means comprises sign and magnitude input weighting means of the I and Q samples. The input weighting applies an R weighting factor to the samples thereby providing the weighted samples with additional A/D conversion gain for correlation, adder control means coupled to the input weighting means for determining whether each of the weighted samples is added to or subtracted from an accumulated value of the weighted samples in accordance with a correlator control signal, means for generating the correlator control signal by comparing a sign of the sample to the PN-code reference signal, and integrator means coupled to the adder control means and the correlator control signal generating means for accumulating and integrating the weighted samples over a correlation time interval. The R factor weighting input for outside crossings is variable under programmed control or may be a constant for a specific correlation interval ($T_{cj}$).

The objects are further accomplished by a method for performing PN-code correlation in a Global Positioning System receiver comprising the steps of sampling a received PN-code modulated carrier in a GPS receiver front end to generate in-phase (I) and quadrature-phase (Q) samples, removing a doppler frequency and PN-code modulation from the modulated carrier in a signal processor, the signal processor comprises a plurality of channels, each of the channels including a correlator means having sign and magnitude input weighting, correlating in the correlator means the weighted I and Q samples with in-phase (IREF) and a quadrature-phase (QREF) components of an internally generated PN-code reference, and processing the correlated I and Q samples in a processor means to determine the phase of the carrier, to provide multi-channel control signals to the signal processor, and to estimate a pseudo-range and a pseudo-range rate. The step of sampling in the GPS receiver front end comprises the step of performing IF sampling or baseband sampling for generating said I and Q samples. The step of performing baseband sampling further comprises the step of correlating the weighted I and Q samples with only the IREF component of the internally generated PN-code reference.

BRIEF DESCRIPTION OF THE DRAWINGS

Other and further features of the invention will become apparent in connection with the accompanying drawings wherein:

FIG. 11A is a logic diagram of the integrator showing overflow control for the I or Q integrator;

FIG. 11B is a timing diagram for the integrator of the multi-Y-tap correlator/integrator showing the time relationship of 2FSXN, a 1 ms correlation interval ($T_{cj}$), and the delayed correlation interval timing pulses $T_{cj}DXN(0)$ for tap 0 and $T_{cj}DXN(1)$ for tap 1;

DESCRIPTION OF THE PREFERRED EMBODIMENT

Figure 1:
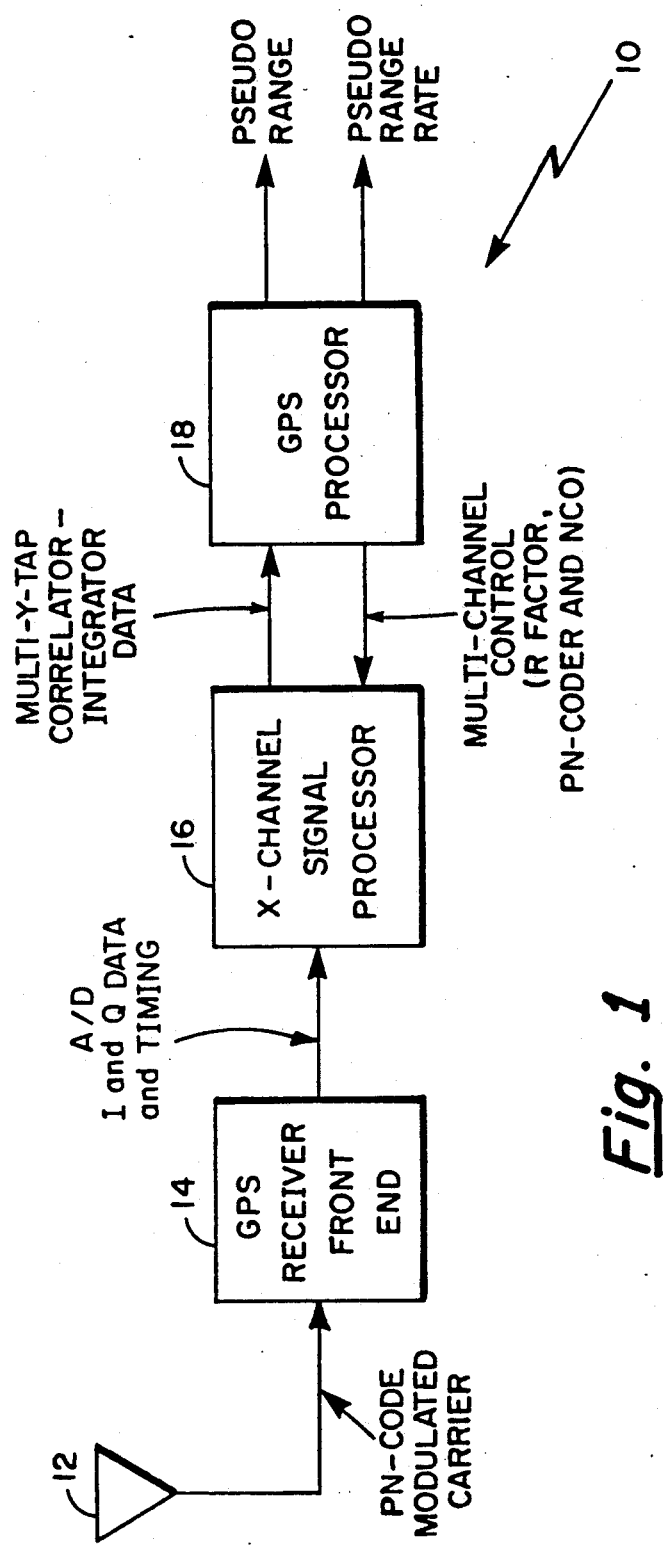
FIG. 1 is a block diagram of a Global Positioning System receiver having an X-channel signal processor 16 comprising the invention.

Referring now to FIG. 1, there is shown a block diagram of a Global Positioning System (GPS) receiver 10. The GPS receiver provides acquisition and tracking of received Binary Phase Shift Keying (BPSK) modulated carrier signals. The GPS receiver 10 comprises an antenna 12 for receiving BPSK modulated carrier signals and the antenna 12 is coupled to a GPS receiver front end (RFE) 14 for performing RF/IF processing with analog-to-digital (A/D) conversion in order to generate in-phase (I) and quadrature-phase (Q) signal outputs. The GPS RFE 14 also includes a receiver frequency standard oscillator and timing synthesizer (not shown but known to one skilled in the art) for generating the GPS receiver 10 clocks and timing pulses. The GPS RFE 14 outputs are coupled to an X-channel signal processor 16 which is used to acquire and track a plurality of satellite vehicle transmitters. The maximum number of channels is twelve which is determined by the number of satellites in view at one time and the minimum number is five with four required for estimating latitude, longitude, altitude, and time. The fifth is required to search the sky for determining the optimum set of four satellites to be used for estimating latitude, longitude, altitude and time. The X-channel signal processor 16 removes the BPSK pseudo-random noise code modulated on the received RF carrier. The X-channel signal processor 16 produces correlator/integrator data which is coupled to a GPS processor 18 and the GPS processor 18 generates an R factor, PN-coder and NCO control signals which are fed back to the X-channel signal processor 16. The GPS processor 18 tracks the received RF carrier to remove the doppler frequency and PN-code modulation in each signal processor channel. The A/D I and Q data from the GPS RFE 14 is coupled to a phase rotator in each channel of the X-channel signal processor 16 for removal of received signal carrier doppler. The GPS processor 18 estimates the pseudo range and pseudo range rate of a GPS satellite.

Figure 2:
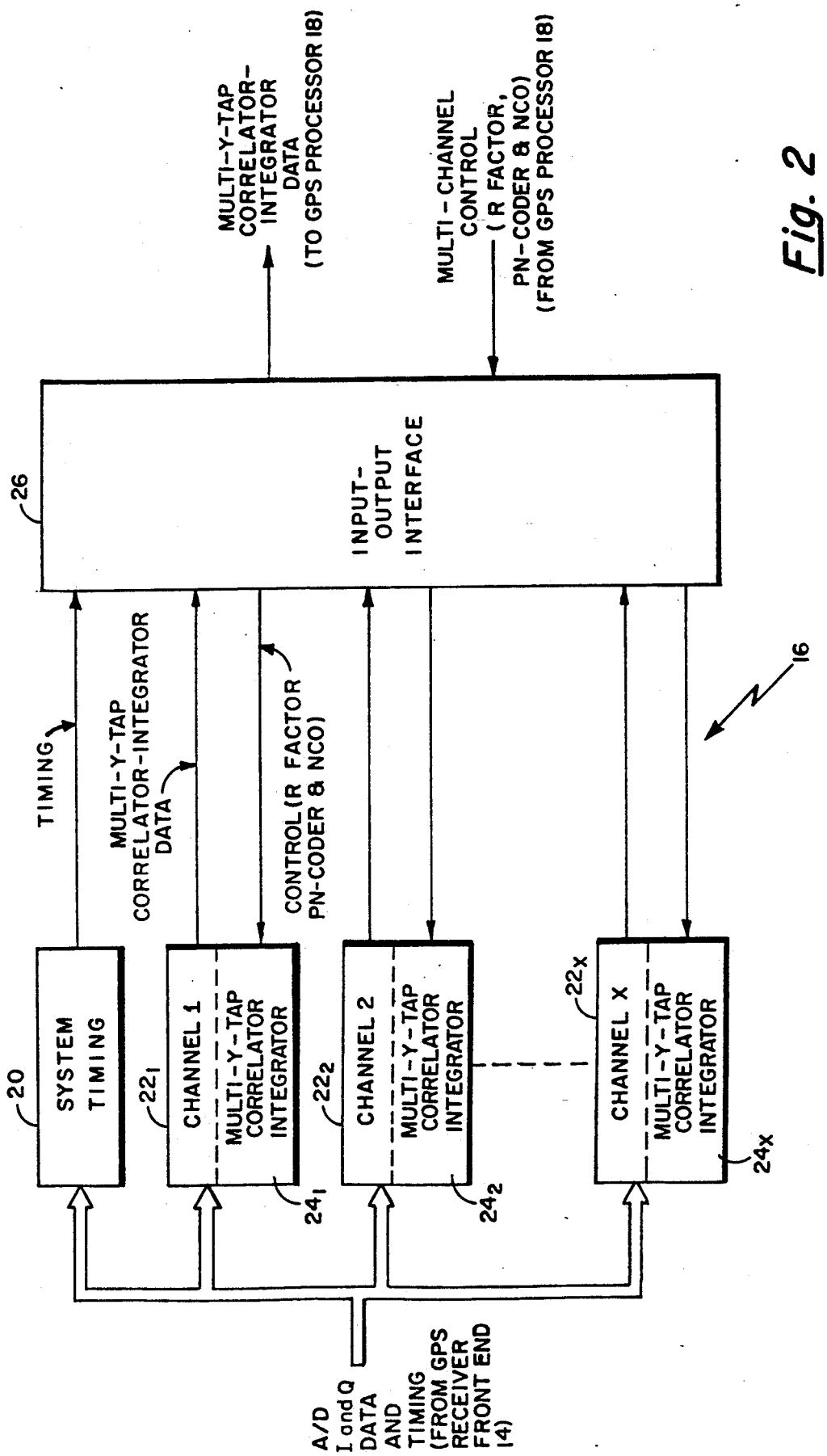
FIG. 2 is a block diagram of an X-channel signal processor comprising the multi-Y-tap correlator/integrator invention.

Referring now to FIG. 2, a block diagram of the X-channel signal processor 16 is shown comprising system timing 20 means and a plurality of channels $22_1$ to $22_X$, each channel comprising the invention of an improved multi-Y-tap correlator/integrator $24_1$ to $24_X$. An input-output interface 26 provides a serial output for the multi-Y-tap correlator/integrator data which is fed to the GPS processor 18 and such interface 26 receives via a serial input an R factor control, PN-coder control and NCO control signals for each channel from GPS processor 18.

Figure 3:
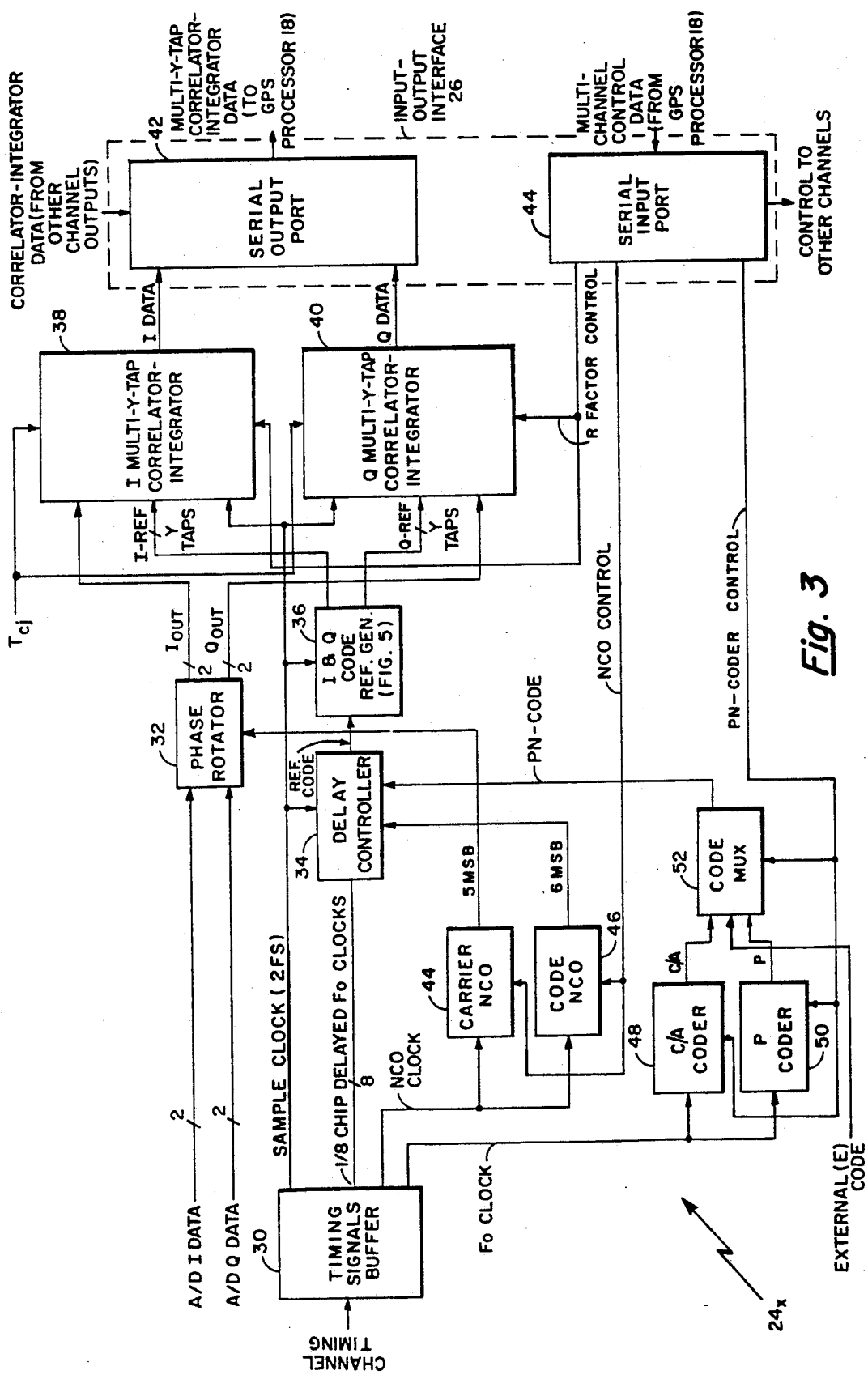
FIG. 3 is a block diagram of one channel of an X-channel signal processor showing the I multi-Y-tap correlator/integrator and Q multi-Y-tap correlator/integrator.

Referring now to FIG. 3, a block diagram of one X-channel $24_X$ of the X-channel signal processor 16 is shown comprising an I multi-Y-tap correlator/integrator 38 and a Q multi-Y-tap correlator/integrator 40. Each X-channel receives timing signals which are coupled to a timing signals buffer 30 for distribution within the channel, and each X-channel receives I and Q data signals from the GPS RFE 14. The //D I and Q data signals are coupled to a phase rotator 32 for removal of received signal carrier doppler. The phase rotator 32 output in each channel 22 is coupled to the Y-tap correlator/integrator to remove the PN-code modulation for code and carrier tracking in the GPS processor 18. The $I_{OUT}$ and $Q_{OUT}$ from the phase rotator 32 are then fed to the I multi-Y-tap correlator/integrator 38 and the Q multi-Y-tap correlator/integrator 40 respectively where the I signal and Q signal correlations strip-off the PN-code modulation for extended range tracking in each channel. A numerical controlled oscillator (NCO) clock signal from the timing signals buffer 30 is coupled to a carrier NCO 44 and a code NCO 46. The carrier NCO 44 produces five bits of the most significant carrier NCO bits of the instantaneous phase output (where each of the bits starting with the most significant bit represents 180°, 90°, 45°, 37.5° and 22.5°) and these 5 MSBs are coupled to the phase rotator 32 for phase rotating the received I and Q data A/D samples. The limited number of carrier NCO bits used for the phase rotator angle does not degrade the phase resolution because the full precision estimates are maintained in the GPS processor 18 shown in FIG. 1. The correlated I and Q data from the I multi-Y-tap correlator/integrator 38 and the Q multi-Y-tap correlator/integrator 40 in each channel is transmitted to the GPS processor 18 at a one millisecond correlation interval time ($T_{cj}$) over a serial output port 42. The code NCO 46 produces 6 bits of the most significant code NCO bits of the instantaneous integer and fractional code chips of delay or range and the most significant bit is 4 P-code (10.23 MHz) chips of delay. The 6 MSBs (represent 4, 2, 1, ½, ¼ and ⅛ P-code chips of delay) are coupled to the delay controller 34. The limited number of code NCO bits used for the delay controller 34 does not degrade fractional chips of delay or range resolution because, as previously noted, the full precision estimates are maintained in the GPS processor 18 shown in FIG. 1. The 6 MSBs of the code NCO 46 are coupled to a delay controller 34 to keep the received I and Q signals centered within a particular correlator/integrator tap. A 2FS sample clock and eight ⅛ chip delayed Fo clocks are coupled to the delay controller 34 along with a signal from the code multiplexor (MUX) 52. The output of the delay controller 34 is a reference code which is coupled to I and Q code reference generator 36. The I and Q code reference generator 36 generates Y I-reference code replica signals which are coupled to the I multi-Y-tap correlator/integrator 38 and also generates Y Q-reference code replica signals which are coupled to the Q multi-Y-tap correlator/integrator 40 where Y is the number of taps in the multi-Y-tap correlator/integrators 38, 40.

Still referring to FIG. 3, the Fo clock, which is the local 10.23 MHz reference, is coupled from the timing signals buffer 30 to a C/A coder 48 and P coder 50. The C/A coder 48 generates a C/A code replica and the P-coder 50 generates a P code replica. The C/A coder 48 and the P coder 50 generate a replica of the PN-code modulated on the received RF carrier signal. The delayed code replica is aligned with the received PN-code A/D samples by the delay controller 34 which produces the REF CODE signal. The C/A and P-codes are coupled to the code multiplexor (MUX) 52 which selects the transfer of such codes, and the output of code MUX 52 is a PN-code which is fed to the delay controller 34 in accordance with a coder control signal received from an input port 44. A PN-code chip is the time or period defined by the PN-code frequency (1.023 MHz or 10.23 MHz for the GPS receiver 10). The I and Q code reference tap spacing is either ½ or 1 PN-code chip spacing, where the PN-codes are C/A, P or E. The GPS C/A code is 1.023 MHz and P-code frequency is equal to the external (E) code frequency 10.23 MHz. The input port 44 receives control data from the GPS processor 18 for R factor, C/A coder, P-coder and NCO control. The R factor control data is coupled to the I multi-Y-tap correlator/integrator 38 and the Q multi-Y-tap correlator/integrator 40. The coder control data is coupled to the C/A coder 48, P-coder 50 and a code multiplexor (MUX) 52. This code control data from the input port 44 provides control for acquisition, code and carrier tracking and when applicable built-in-test capability. Such control data is received from the GPS processor 18 at multiples of a one-millisecond correlation interval for the X-channel signal processor 16 to acquire and track up to X satellites on C/A, P, or E-code where E-code is an external replica of another code transmitted.

Figure 4:
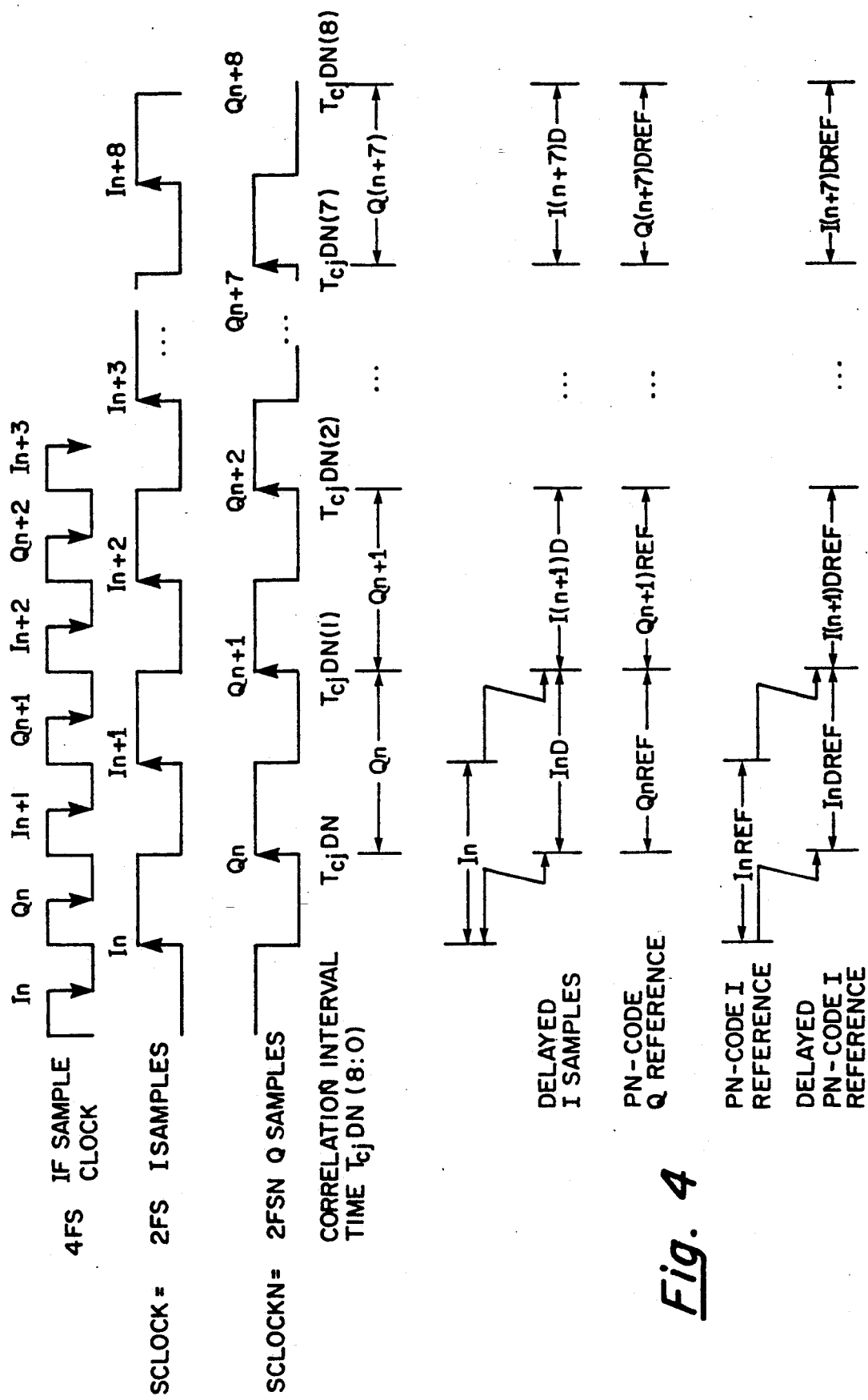
FIG. 4 is a timing diagram for the invention showing I samples and Q samples alignment with a reference code.
Figure 5:
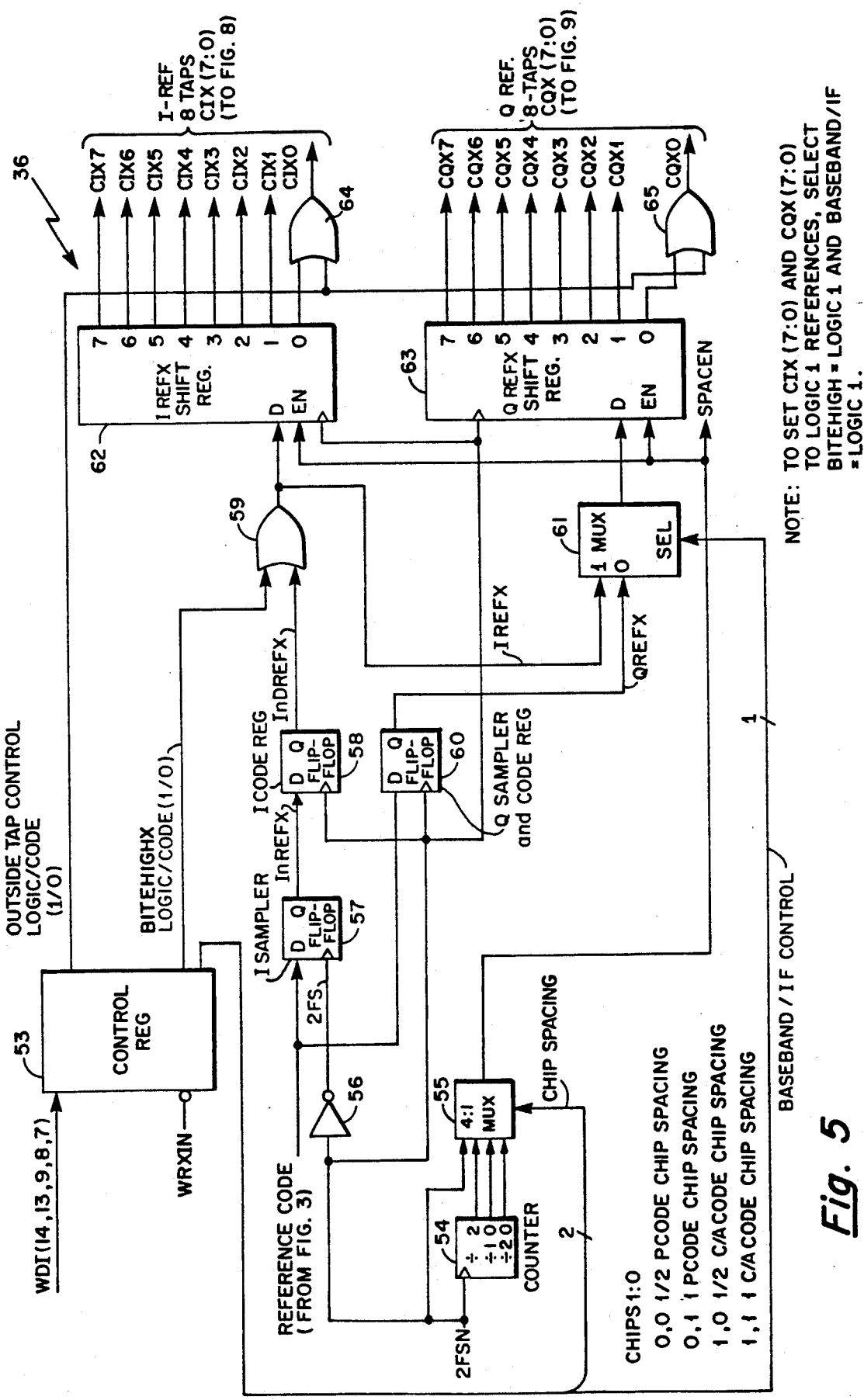
FIG. 5 is a logic block diagram of the I and Q code reference generator shown in FIG. 3.

Referring now to FIGS. 4 and 5, FIG. 5 is a block diagram of the I and Q code reference generator 36. The timing relationship of the I-reference and Q-reference code replica signals to the clock signals (4FS and 2FS) are shown in FIG. 4. The reference code (REF. CODE) signal shown in FIG. 3 and 5 is either for baseband A/D sampling where I and Q samples are taken at the same instant in time or for IF sampling used in the present embodiment where the I and Q samples are sequenced in time through an in-phase A/D converter. IF sampling uses only an in-phase analog-to-digital converter to sample the IF signal at a number of quarter cycle intervals as described in U.S. Patent application Ser. No. 319,504, filed Mar. 6, 1989 entitled "Spread Spectrum Detector," by inventor Robert H. Cantwell and assigned to the present assignee which is incorporated by reference herein. As shown in FIG. 4, every other in-phase sample is followed by a quadrature-phase sample. The I and Q A/D samples are aligned in time for processing I and Q samples together. FIG. 4 shows such alignment for the nth A/D sample $I_n$ and $Q_n$. The $I_n$ sample delayed is $I_nD$ and is aligned in time with the $Q_n$ sample. Because the IF samples are sequenced in time, the PN-code reference must also be sequenced in time for alignment with the I and Q A/D sample times for I and Q PN-code correlation. The C/A coder 48 or P-coder 50 generate a replica of the PN-code modulated on the received RF carrier signal. The code replica generated by the delay control 34 in FIG. 3 is the REF. CODE as noted previously. The six most significant code NCO bits keep the received PN-code modulated carrier signal centered in the selected I or Q correlator tap. The replicated PN-code or the REF. CODE is aligned in time with the I and Q samples as shown in FIGS. 4. The $I_n$REF signal is delayed similarly as the $I_n$ A/D sample is delayed in order to line up $I_n$DREF with the $Q_n$REF signal. This delay is accomplished as shown in FIG. 5 by the D flip-flops 57, 58, 60 which are clocked by 2FSN or 2FS where 2FS is generated by an inverter 56.

Referring again to FIGS. 3 and 4, the leading edge of the delayed correlation interval timing pulses $T_{cj}DN(8:0)$ are shown. A correlation interval pulse ($T_{cj}$) is delayed to account for the signal processing delays. The delay accounts for the number of clock cycles it takes to propagate the P, E or C/A codes through the signal processor code MUX 52, delay controller 34 and I and Q code reference generator 36. The matched shift register delays for PN-code chip spacing generated by the 9-bit shift register 148 (shown in FIG. 9) to produce the $T_{cj}DN(8:0)$ timing as shown in FIG. 4.

Referring now to FIGS. 4 and 5, the IREFX signal at the output of OR gate 59 and the QREFX signal at the output of D-flip-flop 60 are coupled to the MUX 61 for selecting the QREFX shift register 63 via the D input. The IREFX shift register 62 generates the IREF signals (CIX7–CIX0) for 8 taps in the present embodiment and the QREFX shift register 63 generates the QREF signals (CQX7–CQX0) for 8 taps in the present embodiment. The IREFX shift register 62 and QREFX shift register 63 generate correlator tap spacing CIX(7:0) and CQX(7:0) at either ½ or 1 PN-code chip spacing, where the PN-codes are the C/A code at 1.023MH or the P-code at 10.23MH. The reference code timing for CIX(7:0) and CQX(7:0) is listed in Table 1. The 4:1 MUX 55 which is coupled to the outputs of counter 64 selects either the 2FSN clock or the 2FSN clock divided by 2, 10 or 20 for the CIX(7:0) and CQX(7:0) correlator tap spacing. The output (SPACEN) of the 4:1 MUX 55 is coupled to enable inputs of the IREFX and QREFX shift registers 62, 63 in order to control the ½ or 1 PN-code chip spacing for the CIX(7:0) and CQX(7:0) correlator taps. A control register 53 receives a 5-bit control word WDI(14,13,9,8,7) and generates five control signals comprising outside tap control logic/code (1/0), BITEHIGHX-logic/code (1/0), chip-spacing (1:0) and baseband/IF control. The outside tap control logic/code signal is coupled to the inputs of OR gates 64 and 65 for a code reference or a logic one reference for only the outside correlator taps CIXO and CQXO for noise and interference evaluation or built-in testing. The BITEHIGHX-logic/code signal is coupled to an input of OR-gate 59 for a code reference if logic 0 or a logic 1 reference for all the correlator taps (CIX(7:0) and CQX(7:0) to provide built-in testing, noise or interference evaluation. The chip spacing (1:0) signals are coupled to the 4:1 MUX 55 for selecting the IREFX and WREFX correlator tap spacings. The baseband/IF control signal is coupled to the select input of MUX 61 for IF sampling with an IREFX and WREFX or for baseband sampling using the IREFX for both I and Q correlator taps. There are jamming and interference signals that can be defeated by non-linear processing techniques. One embodiment of these techniques is to use the IREFX for both the I and Q correlator with IF sampling taps by controlling the MUX 61 with the baseband/IF control signal. This embodiment also allows a multi-channel signal processor to be used for both IF sampling and baseband sampling analog-to-digital A/D converters. Baseband sampling uses A/D converters for both the in-phase samples and quadrature-phase samples, taking both in-phase and quadrature-phase samples at the same time.

TABLE 1

CORRELATOR PN-CODE CHIP SPACING

| CLOCK TIMING | P-CODE CHIP SPACING | CORRELATOR TAP NUMBER CIX(7:0) or CQX(7:0) |
|---|---|---|
| 2FSN | 1/2 | \|0\|1\|2\|3\|4\|5\|6\|7\| |
| 2FSN/2 | 1 | \| 0 \| 1 \| 2 \| 3 \| 4 \| 5 \| 6 \| 7 \| |
| 2FSN/10 | 5 | \|   0   \|   1   \|   2   |
| 2FSN/20 | 10 | \|          0          \|          1 |

NOTE:
1/2 C/A code chip spacing equals 5 P-code chips. 1 C/A code chip spacing equals 10 P-code chips. The PN-code comprises the GPS P-code and C/A code chip spacing.

Figure 6:
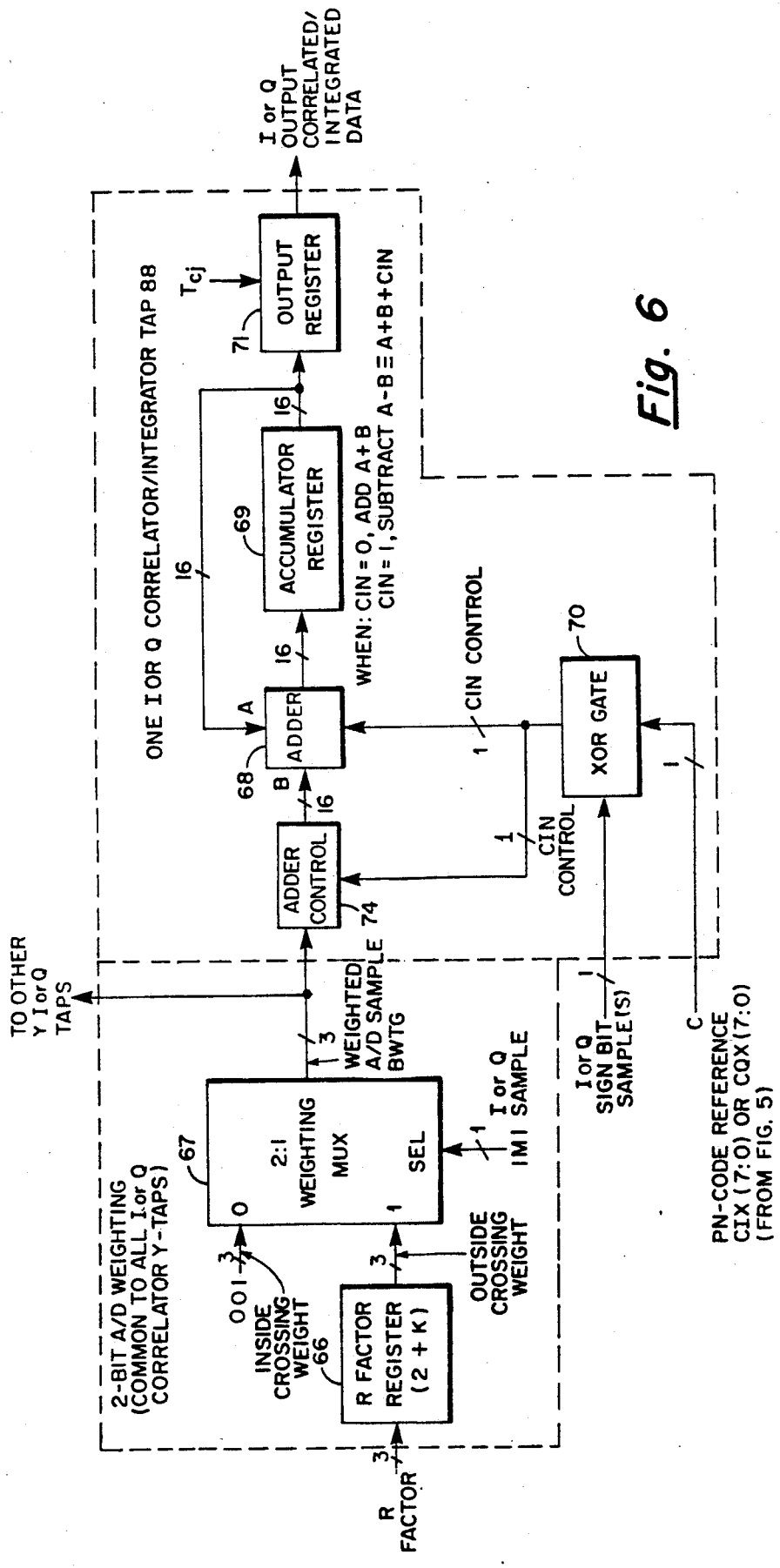
FIG. 6 is a functional block diagram of an I or Q correlator/integrator tap having I or Q input weighting for a 2-bit A/D.
Figure 7:
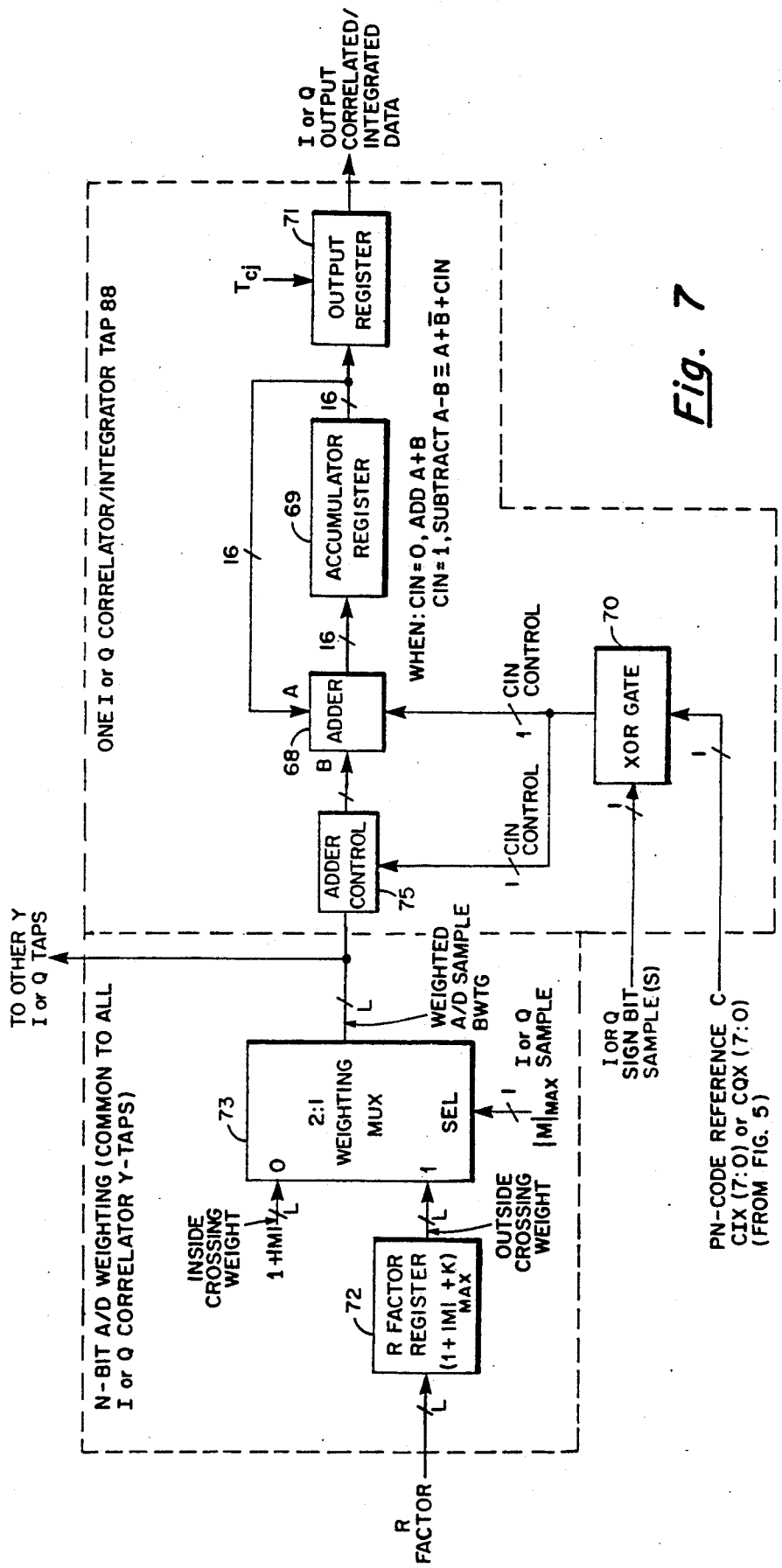
FIG. 7 is a functional block diagram of an I or Q correlator/integrator tap having input weighting for an N-bit A/D.

Referring again to FIG. 3, the phase rotated samples $I_{out}$ and $Q_{out}$ from the phase rotator 32 are correlated in the multi-Y-tap correlator/integrator 38, 40 with either the C/A, P or E-code Y I-references and Y Q-references. The PN-code reference in a multi-Y-tap correlator has tap spacings at approximately ½ or 1 PN-code chip intervals. The received samples spaced T seconds apart are correlated with the PN-code reference C(jT) over the J sample correlation interval $T_{cj}$ where each code and A/D sample time is jT. The function performed by each correlator/integrator tap is:

$$I_{TAP} = \sum_{j=0}^{J-1} S_I(jT) \oplus C(jT) [1 + |M_I(jT)| + K]$$

$$Q_{TAP} = \sum_{j=0}^{J-1} S_Q(jT) \oplus C(jT) [1 + |M_Q(jT)| + K]$$

where:
T = 1/(2Fs) I and Q sample period
$T_{cj}$ = JT Correlation Interval
S = A/D Sign Bit of I or Q sample
C = PN-Code Reference = CIX(7:0) or CQX(7:0)
C(jT)%32 One of the correlator taps CIX(7:0) or CQX(7:0)
⊕ = Exclusive-Or Symbol
|M| = Magnitude of the I or Q Sample Magnitude Bits
|M| < |M|$_{MAX}$ then K = 0
|M| = |M|$_{MAX}$ then K = value of K
R Factor = 1 + "M|$_{MAX}$ + K Referring now to FIG. 6 and FIG. 7, FIG. 6 shows a functional block diagram of an I or Q correlator/integrator tap with input weighting for the data from a 2-bit A/D in GPS RFE 14 (FIG. 1). FIG. 7 is a functional block diagram of an I or Q correlator/integrator tap with input weighting for the data from an N-bit A/D in GPS RFE 14. The A/D I and Q data from the GPS RFE 14 is from an adaptive analog-to-digital (A/D) converter (described in U.S. Patent application Ser. No. 319,504 referenced hereinbefore) which detects the received RF carrier zero-crossings using a plus and minus A/D sign bit. A/D magnitude bits are used to defeat jamming and interference. The correlator weighting of the A/D bits provides A/D conversion gain against jamming and interference Binary weighting of the A/D magnitude bits is for a linear A/D. Non-linear weighting for the most significant magnitude is for an adaptive A/D converter. The R factor for both linear and adaptive A/D converters is the weight applied to the most significant magnitude. The most significant magnitude weighted by the R factor is considered an outside crossing when the voltage level of the input to the A/D converter exceeds the most significant magnitude threshold. All other magnitude weights are considered inside crossings. The I or Q correlator/integrator tap 88 in FIGS. 6 and 7 respectively comprise an adder 68 which is coupled to an accumulator register 69. The output of accumulator register 69 is coupled to an input of the output register 71 and it is also fed back to an A input of adder 78. The B input to adder 68 receives a 16-bit word from an adder control 74 (FIG. 6) or adder control 75 (FIG. 7). The adder control 74 (FIG. 6) receives a 3-bit weighted A/D sample (BWTG) from a single weighting network which is common to all I or Q correlator/integrator Y-taps. The adder control 75 (FIG. 7) receives an L-bit weighted A/D sample (BWTG) from a single weighting network which is common to all I or Q correlator/integrator Y-taps. The correlator CIN signal generated by XOR-gate 70 is also coupled to adder control 74 (FIG. 6) and 75 (FIG. 7) for determining the B input to adder 68. The adder 68 performs an add or subtract function depending on the correlation CIN control signal generated by an exclusive-OR (XOR) gate 70. The inputs to the correlator XOR gate 70 are an I or Q sign bit sample (S) and a PN-code reference replica (C). An R factor register 66 (FIG. 6) and 72 (FIG. 7) stores the R factor value which may be a fixed R factor or the R factor may be downloaded from the GPS processor 18. In the 2-bit A/D weighting embodiment (FIG. 6) a 3-bit output of the R factor register 66 is coupled to the outside crossing input of a 2:1 weighting MUX 67 and a second input of MUX 67 is 1 + |M| for inside crossings. With the 2-bit A/D when the |M| equals zero, the connection is to a logic level (001) for the inside crossings. The R factor is determined by 1 for the sign bit, the magnitude of |M|$_{MAX}$ and K; hence, the R Factor equals 1 + |M|$_{MAX}$ + K. For the 2-bit A/D |M|$_{MAX}$ = 1 and the R factor equals 2 + K for outside crossings. In the N-bit A/D weighting (FIG. 7) comprising a sign bit and N − 1 magnitude bits, the magnitude is the one's compliment of the magnitude bits when the sign bit is negative. In the present embodiment of a 2-bit A/D input (FIG. 6) comprising a sign bit and a magnitude bit, the magnitude is the one's compliment of the magnitude bit when the sign bit is negative. The select (SEL) input of MUX 67 is controlled by the maximum value for the magnitude |M| of the A/D sample ($I_{out}$ or $Q_{out}$ in FIG. 3), generated by the exclusive-OR (XOR) of the sign bit S with the magnitude bit M as shown in Table 2.

TABLE 2
A/D INPUT SAMPLE WEIGHTING CONTROL

| S | M | S XOR M $\|M\|$ | A/D INPUT Sample Weight | Crossing |
|---|---|---|---|---|
| 0 | 1 | 1 | R Factor | Outside |
| 0 | 0 | 0 | 1 | Inside |
| 1 | 1 | 0 | 1 | Inside |
| 1 | 0 | 1 | R Factor | Outside |

Each correlator/integrator tap 88 correlates the I or Q sign bit sample (S) with the PN-code reference replica (C) and accumulates an I or Q weighted A/D sample by adding or subtracting the weighted A/D sample from the integrated value in the accumulator register 69. The weighted A/D sample (BWTG) having 3-bits is added in adder 68 when the sign bit (S) correlation matches the PN-code reference replica (C) and is subtracted in adder 68 when there is a correlation mismatch. The PN-code correlator-integrator tap 88 arithmetic is listed in Table 7. The N-bit A/D weighting is shown in Table 3 and 4. The correlator weights are $1 + |M|$ for the linear N-bit A/D converter as listed in Table 3. The adaptive A/D scaling or weighting of the bits is binary except for the outside crossings of the most significant magnitude bit weighted by R. The correlator weights for an adaptive N-bit A/D converter are $1 + |M| + K$ as listed in Table 4. Except for the most significant magnitude bit, the samples that exceed the outside thresholds are weighted by $1 + |M|_{MAX} + K$. With a one bit A/D there are no outside thresholds, the magnitude of M ($|M|$) equals zero and the 1-bit correlator weight is times one for the sign bit. The linear/adaptive A/D weighting for any size A/D is listed in Table 5. A 3-bit A/D sued to show an example of the weighting values is listed in Table 6. The one's compliment input weighting using the magnitude provides a unique decode for detecting outside crossings. The $|M|T_{MAX}$ decode for outside crossings is when all the magnitude bits equal a binary or logic one. The one's compliment input weighting uses the same weights for positive and negative numbers, $+1$ to $+R$ as listed in Table 6. This property of the weights provides a unique correlator independent of the number of A/D bits. The correlation is the "exclusive-OR" of the A/D sign bit (S) with the PN-code reference replica (C) and adder control 74, 75 using the correlator output as the carry-in (CIN). The more complicated two's compliment input weighting numbers are both positive and negative, $+1$ to $+R$ and $-1$ to $-R$ as listed in Table 6. Now a more complex correlator and decoding structure are required to select the A/D sample weight for a correlation match or mismatch. The "exclusive-OR" of the sign bit with the PN-code reference replica determines if the A/D input weighted sample is a match or mismatch and if the magnitude of the input sample weighted is to be added or subtracted from the accumulated value in the integrator, not the sign bit of the A/D sample.

TABLE 3
LINEAR BINARY WEIGHTED A/D MAGNITUDE WEIGHTS $(1+|M|)$

| N | S⊕C | S $M_0M_1M_2 \ldots M_{N-2}$ | $\|M\|MAX$ |
|---|---|---|---|
| 1 | ±1 | 1 | 0 |
| 2 | ±1 | 1+1 | 1 |
| 3 | ±1 | 1+1+2 | 3 |
| 4 | ±1 | 1+1+2+4 | 7 |
| . | . | . | |
| . | . | . | |
| . | . | . | |
| N | ±1 | $1+1+2+4 \ldots 2^{N-2}$ | $2^{N-1}-1$ |

R FACTOR = $1 + |M|_{MAX} = 2^{N-1}$
BINARY WTGS ±1 $2^{N-2}$ ... $2^2$ $2^1$ $2^0$
BIT NUMBER N-1 N-2 ... 2 1 0
N A/D BITS S $M_{N-2}$ ... $M_2$ $M_1$ $M_0$
Where: S = A/D sign bit
M = A/D magnitude bits

TABLE 4
ADAPTIVE A/D MAGNITUDE WEIGHTS $(1+|M|+K)$

| N | S⊕C | S $M_0M_1M_2 \ldots M_{N-2}$ | $\|M\|_{MAX}$ |
|---|---|---|---|
| 1 | ±1 | 1 | 0 |
| 2 | ±1 | 1+1+K | 1 |
| 3 | ±1 | 1+1+2+K | 3 |
| 4 | ±1 | 1+1+2+4 | 7 |
| . | . | . | |
| . | . | . | |
| . | . | . | |
| N | ±1 | $1+1+2+4 \ldots 2^{N-2}+K$ | $2^{N-1}-1$ |

R FACTOR = $1 + |M|_{MAX} + K = 2^{N-1} + K$
Where,
$|M|$ = Magnitude of the I or Q Sample Magnitude Bits
$|M| < |M|_{MAX}$ then K = 0
$|M| = |M|_{MAX}$ then K = value of K
BINARY WTGS ±1 $2^{N-2}$ ... $2^2$ $2^1$ $2^0$
BIT NUMBER N-1 N-2 ... 2 1 0
N A/D BITS S $M_{N-2}$ ... $M_2$ $M_1$ $M_0$

TABLE 5
LINEAR/ADAPTIVE A/D WEIGHTING

| 1 BIT A/D | 2 BIT A/D | 3 BIT A/D | N BIT A/D |
|---|---|---|---|
| | | | +R |
| | | +R | . |
| | | +3 | . |
| | +R | +2 | +2 |
| +1 | +1 | +1 | +1 |
| −1 | −1 | −1 | −1 |
| | −R | −2 | −2 |
| | | −3 | . |
| | | −R | . |
| | | | −R |

For ADAPTIVE A/D: $R = 2^{N-1} + K$
For LINEAR A/D: K=0 & $R = 2^{N-1}$

TABLE 6
3-BIT A/D EXAMPLE

| One's Compliment Number | S | $M_1$ | $M_0$ | Two's Compliment A/D Weighting | One's Comp. $M_1$ | $M_0$ | $\|M\|$ | One's Comp. A/D Weighting $1+\|M\|+K$ | Crossing |
|---|---|---|---|---|---|---|---|---|---|
| +3 | 0 | 1 | 1 | +R | 1 | 1 | +3 | +R | Outside |
| +2 | 0 | 1 | 0 | +3 | 1 | 0 | +2 | +3 | Inside |
| +1 | 0 | 0 | 1 | +2 | 0 | 1 | +1 | +2 | Inside |
| +0 | 0 | 0 | 0 | +1 | 0 | 0 | +0 | +1 | Inside |
| −1 | 1 | 1 | 1 | −1 | 0 | 0 | +0 | +1 | Inside |
| −2 | 1 | 1 | 0 | −2 | 0 | 1 | +1 | +2 | Inside |
| −3 | 1 | 0 | 1 | −3 | 1 | 0 | +2 | +3 | Inside |
| −4 | 1 | 0 | 0 | −R | 1 | 1 | +3 | +R | Outside |

TABLE 6-continued
3-BIT A/D EXAMPLE

| One's Compliment Number | S | M₁ | M₀ | Two's Compliment A/D Weighting | One's Comp. M₁ | One's Comp. M₀ | \|M\| | One's Comp. A/D Weighting 1+\|M\|+K | Crossing |
|---|---|---|---|---|---|---|---|---|---|
| R Factor Adaptive A/D: $R=2^{N-1}+K=4+K$ | | | | | R Factor Linear A/D: $K=0$ & $R=2^{N-1}=4$ | | | | |

Figure 8:
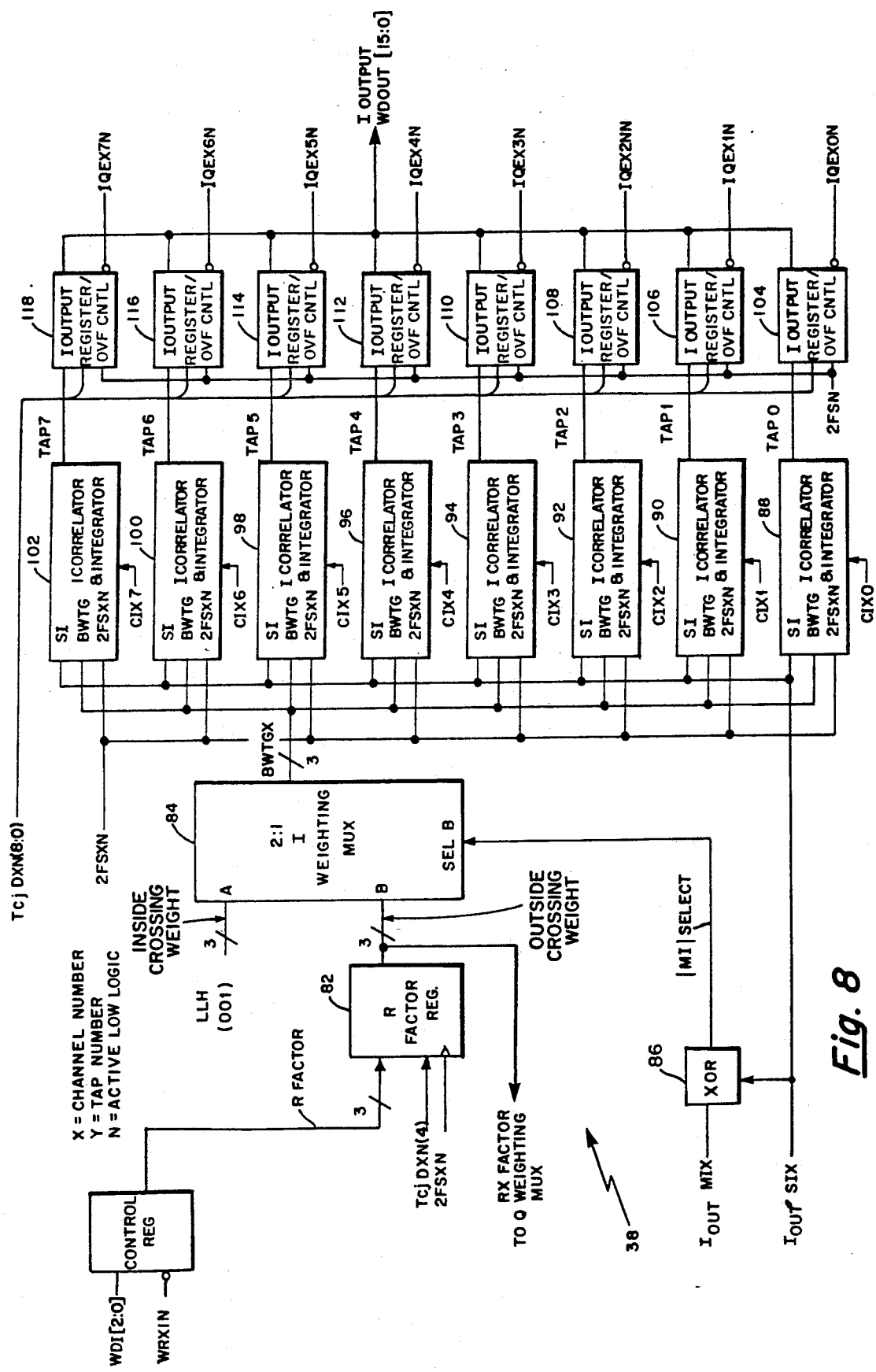
FIG. 8 is a block diagram of the invention comprising an I eight-tap correlator/integrator.
Figure 9:
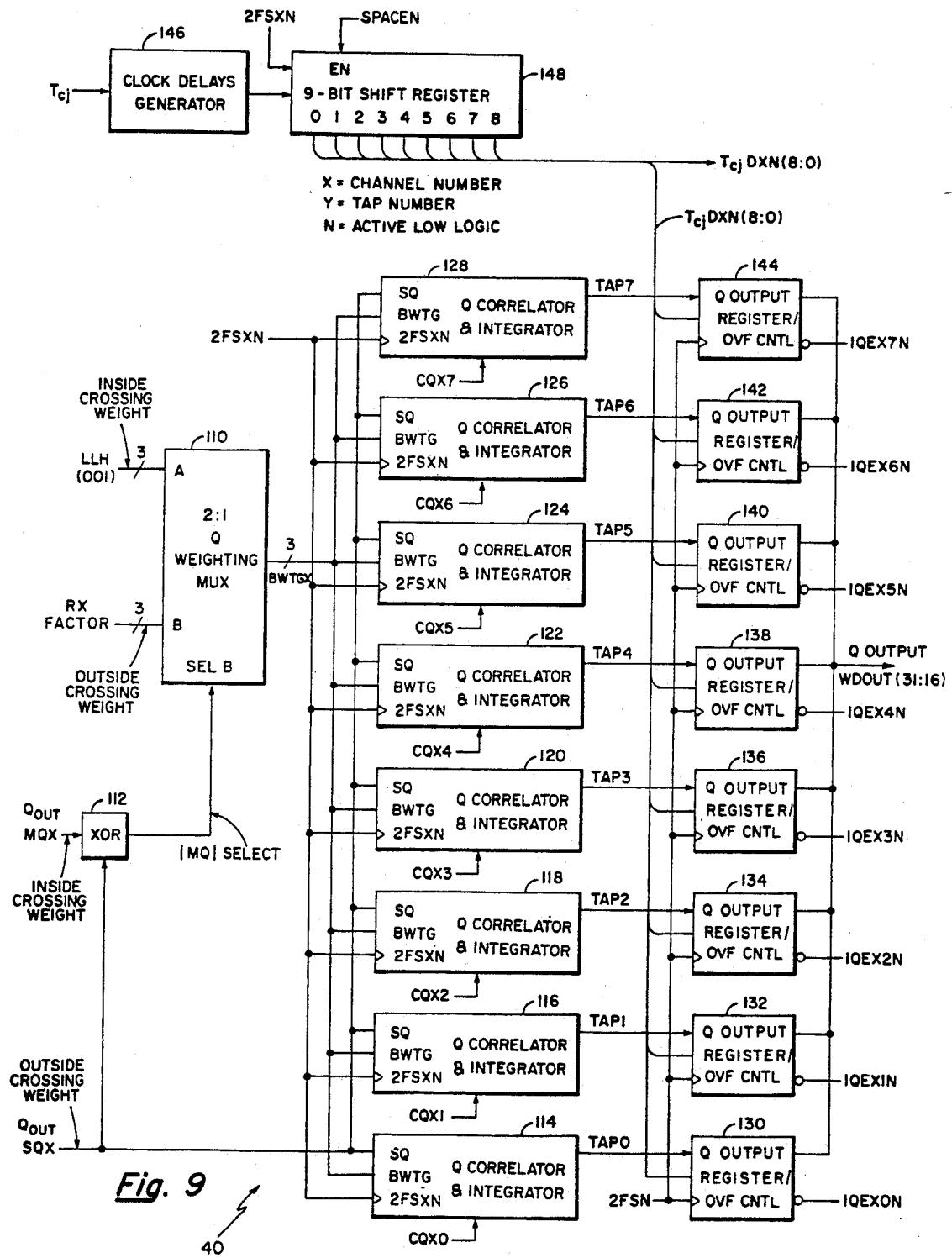
FIG. 9 is a block diagram of the invention comprising a Q eight-tap correlator/integrator.

Still referring to FIG. 6 and 7, one I or Q correlator/integrator tap 88 with sign and magnitude (one's compliment) input weighting and control is shown in FIG. 6 for the present GPS receiver 10 having a 2-bit adaptive A/D in GPS RFE 14, and an I or Q correlator/integrator tap 88 is also shown in FIG. 7 for the general case of an N-bit adaptive A/D in GPS RFE 14. As noted above, the single R factor register 66, 72 can be hardwired to the 2:1 weighting MUX 67, 73 for a fixed R factor or the R factor may be downloaded from the GPS processor 18 along with the control words for each signal processor channel $22_{(1-X)}$. The number of input weighting bits for the MUX 67, 73 depends on the maximum value of the R factor selected. The advantage of the present invention is that the R factor register 66, 72 and the 2:1 weighting MUX 67, 73 are common to all Y-taps I or Q in the multi-Y-tap correlator/integrators 38, 40. The simple control for the 2:1 weighting MUX 67, 73 is the maximum value for the magnitude \|M\| of the I or Q A/D sample ($I_{out}$ or $Q_{out}$ in FIG. 3). With a 2-bit A/D (FIG. 6) the sign bit is plus or minus and the magnitude bit is logic zero for inside crossings and logic one for outside crossings, the maximum value of the magnitude \|M\|. The general case with an N-bit A/D (FIG. 7) is the plus or minus sign bit with more than one magnitude bit. In this general case when each one of the magnitude bits is equal to logic one, it is an outside crossing weighted by the R factor. The weightings for no outside crossings are listed in Tables 4, 5 and 6. In this general case the magnitude of M is not at maximum value and magnitude $\|M\|_{MAX}$ selects the logic 0 MUX weighting input. With a 2-bit A/D (FIG. 6) the input weighting is 1, and for an N-bit A/D (FIG. 7), the input weighting is 1 \|M''\|. In a special case of a 1-bit A/D there is only the plus or minus sign bit and the magnitude is logic 0; there are no outside crossings. In the present embodiment of a 2-bit A/D input as shown in FIG. 6, the R factor register 66 equal to 0 results in evaluating only inside crossings as defined in Table 6. By setting the R factor register 66 equal to 1 results in the equivalent processing of a 1-bit A/D input. Setting the R factor register 66 equals to $2(K=0)$ produces a linear 2-bit A/D converter magnitude weight for outside crossings of the A/D sample. Setting the R factor register 66 between 3 and 7 (2+K for K between 1 and 5) produces the adaptive 2-bit A/D converter magnitude weight for outside crossings of the A/D sample. The linear and adaptive magnitude weights are determined by equations listed in Table 3 and Table 4 and by example and equations in Table 5 and Table 6. Such one's compliment magnitude weighting reduces the number of input weighting bits that have to be distributed. The selected I or Q input weighting magnitude BWTG is distributed to all of the multi-Y-tap I or Q correlator/integrators 38, 40. The advantages of the present invention sign and magnitude input weighting include compatability with any size A/D (1 to N bits), the magnitude \|M\| is simply the one's compliment of the magnitude samples when the sign bit is negative, the single R factor register 66, 72 can be down loaded from the GPS processor 18 for any desired R factor value, and the I and Q A/D sample weight (BWTG or TWTGX) is common to all I of Q correlator/integrator taps (88–102, 114–128) as shown in FIGS. 8 and 9. Using the sign and magnitude in the I or Q correlator/integrator 88 in the present invention provides the following advantages: for correlation the PN-code reference only has to be exclusive-OR'd with the sign bits for plus and minus adder control; the B input is sign extended and added to A for plus control; minus control takes the one's compliment of the sign extended B input; the plus or minus adder control is the carry-in (CIN) to the adder; the integrator output is latched in an output register 71 by the $T_{cj}$ pulse, the correlation time interval, and the first sample in the new correlation interval, can be loaded directly into the accumulator register 69 by bypassing the adder 68 or adding zero with the first sample using the $T_{cj}$ timing pulse for control.

The 2-bit correlator/integrator 38, 40 for the sign and magnitude A/D converter bits is shown functionally in FIG. 6 and the details of the present embodiment are shown in FIGS. 8 and 9. The sign and magnitude input weights are listed in Table 2. The R factor for the 2-bit adaptive A/D is $1+\|M\|_{MAX}+K=2+K$. The R factor register 66 when loaded by the GPS Processor 18 is 3-bits for values of 0 to 7.

Referring now to FIG. 8, a block diagram of the I multi-Y-tap correlator/integrator 38 is shown comprising eight I correlator/integrator taps 88–102 (TAP-0-TAP7). In the signal names listed in FIG. 8, X represents a channel number, Y indicates the tap number and N indicates an active low logic signal. A control register 80 receives a 3-bit data word, WDI(2:0), for an R factor input from a word data input bus (WDI). A 3-bit binary input LLH representing the inside crossing weight is hard wired to a 2:1 I weighting MUX 84 equal to the binary number 001. The 3-bit R factor output of control register 80 representing the outside crossing weight is coupled to an R factor register 82. The output of the R factor register 82 is coupled to the 2:1 I weighting multiplexor (MUX) 84. The magnitude of $I_{OUT}$ data (\|MI''\|) generated by exclusive-OR (XOR) gate 86 is coupled to the select B input of the 2:1 I weighting MUX 84. The logic for selecting the inside crossing weight or the outside crossing weight for the I A/D samples is listed in Table 2. The inputs to XOR gate 86 are the $I_{OUT}$ data sign (SIX) and $I_{OUT}$ magnitude (MIX). The output of the 2:1 I weighting multiplexor 84 is the B weight (BWTGX) which is coupled to an input of each one of the I the correlator and integrators 88–102. The sign (SIX) of the $I_{OUT}$ data is also coupled to an input of each I correlator and integrator multi-8-tap-s 88–102 in addition to the input timing clock 2FSXN. The outputs of I correlator and integrators (TAP0-TAP7) are coupled to the I output registers-/OVF CNTL 104–118 respectively.

Referring now to FIG. 9, a block diagram of the Q multi-Y-tap correlator/integrator 40 is shown comprising eight Q correlator/integrators 114–128 (TAP-0-TAP7). A 2:1 Q weighting multiplexor (MUX) 110 receives the 3-bit LLH binary input representing the inside crossing weight and the 3-bit RX factor representing the outside crossing weight from the R factor register 82 shown in FIG. 8. The output of the 2:1 Q weighting MUX 110 is the B weight (BWTGX) which is coupled to an input of each one of the Q correlator/integrators 114-128. The select B input of MUX 110 is coupled to the output of an exclusive-OR (XOR) gate 112 which generates the magnitude of $Q_{OUT}$ data (|MQ|). The logic for selecting the inside crossing weight or the outside crossing weight for the Q A/D sample is listed in Table 2. The input to such XOR gate 112 comprises the magnitude of $Q_{OUT}$ data (MQX) and the sign of the $Q_{OUT}$ data (SQX). The sign of $Q_{OUT}$ data (SQX) is also coupled to an input of each Q correlator and integrator tap 114-128 in addition to the input timing clock 2FSXN. The output of each Q correlator and integrator 114-128 is fed to Q output register/OVF CNTL 130-144 respectively between correlation intervals ($T_{cj}$).

Referring to FIGS. 3, 5 and 9, over any correlation interval $T_{cj}$ there is an integer number of 2FSXN clock cycles, an integer number of PN-code chips, an integer number of Fo clock cycles and an integer number of NCO clocks. The exact time zero for each correlation interval is when the PN-coder control signal and NCO control signal from serial input port 44 are synchronously loaded to start the new correlation interval by $T_{cj}$ timing pulse. The reference code in FIGS. 3 and 5 is reclocked by 2FSXN in the I and Q code reference generator 36 to align the PN-code reference replica with the incoming A/D samples. The carrier NCO 44 output is reclocked by 2FSXN in the phase rotator 32 to align the carrier NCO output with the incoming A/D samples. The clock delays 146 generator in FIG. 9 accounts for the PN-code Fo clock cycle propagation delays through the C/A coder 48 or P-codes 50, code MUX 52, PN-code delay controller 3, and the 2FSXN clock delays through D-flip-flop 57, 58 and 60 shown in FIG. 5. The 9-bit shift register 148 delays for PN-code chip spacing shown in Table 1 accounts for the IREF and QREF shift registers 62, 63 delays to guarantee that each correlator/integrator tap (88-102) and (114-128) correlates and integrates the same PN-code reference replica sequence for exactly the correlation interval time $T_{cj}$ (1 ms). The correlation is performed continuously at the A/D sample rate. The integrator function is to integrate over a fixed time interval which is the time between correlation intervals and then transfer each integrator tap output (TAP0-TAP7) to its corresponding holding output register/OVF CNTL 130-144. The value accumulated in the integrator is set to zero (DUMPED) at the start of a new correlation interval. The first correlated value in the new correlation interval is the first A/D input weighted sample BWTGX.

Figure 10:
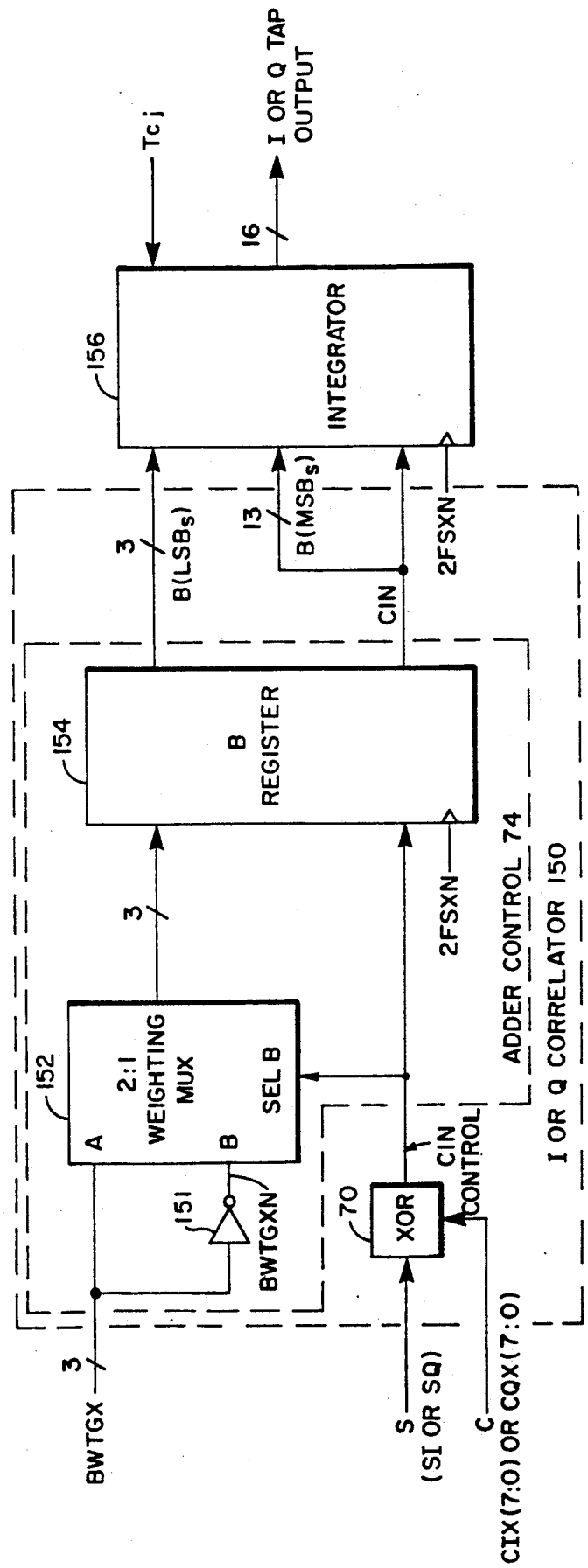
FIG. 10 is a logic block diagram of the I or Q correlator coupled to the integrator.

Referring now to FIG. 10, a more detailed logic diagram of the I or Q correlator 150 is shown coupled to the integrator 156. The correlator or XOR gate 70 determines if there is a match or mismatch between the sign bit (S) and the PN-code reference replica (C) producing a carry-in CIN signal for the correlation as shown in Table 7. The CIN signal controlling the integrator 150 and adder control 74 is fed to a 2:1 weighting multiplexor (MUX) 152 and also fed to a B register 154, which in combination implement the adder control 74. The weighting data, BWTGX and BWTGXN (from inverter 151), are coupled to the inputs of the 2:1 weighting MUX 152 and CIN determines whether BWTGX or its compliment BWTGXN is gated to the B register for clocking to the integrator 156. The 3-bit weighting data to the B register is clocked at the sample rate 2FSXN into the pipeline B register 154 for input to the integrator 156. Table 7 lists the PN-code I or Q correlation and integration functions performed in the I and Q correlator 150 and integrator 156 depending on the value of the carry-in CIN signal.

Referring now to FIGS. 10, 11A and 11B, a detailed logic diagram of the integrator 156 is shown in FIG. 11A comprising the adder 68 coupled to accumulator register 69. The 16-bit input to adder 68 is coupled to the 3 LSB positions of the B register 154 in FIG. 10 and the CIN signal is coupled to the 13 MSB positions of the B register 154 to sign extend the B input to 16-bits. The 16-bit A input of the adder 68 is generated by AND gate 164 having a first input comprising 16-bits from the accumulator register 69 outputs and the second input being the $T_{cj}$DXN(7:0) timing signals. A particular tap selects one timing signal and is coupled to the 16-bit positions for a zero input to adder 68 when the $T_{cj}$DXN timing pulse is active at the start of a new correlation interval $T_{cj}$. The tap 0 timing pulse is $T_{cj}$DXN(0) input to AND gate 164 is shown in FIG. 11B. The output of adder 68 is coupled to accumulator register 69 which is clocked by the 2FSXN sample clock. The output of the accumulator register 69 is fed back to the adder 68 via AND gate 164 and is gated by timing interval signals $T_{cj}$DXN(7:0) and two of these timing signals for integrator 156 tap 0 and 1 are shown in FIG. 11B in relation to sample clock 2FSXN. The 15 MSB output of accumulator register 69 is coupled to overflow control 166 also clocked by 2FSXN in accordance with the occurrence with the correlation timing interval $T_{cj}$. The overflow control output comprises the 16-bit word outputs $WD_{OUT}$ (15:0) for the I integrator 156 and $WD_{OUT}$ (31:16) for the Q integrator 156. At the start of a correlation interval, the $T_{cj}$DXN(7:0) pulses for each I and Q correlator/integrator tap are used to enable zeroing the A input to the adder 68 for the first A/D sample correlated in the new correlation interval. The 2-bit A/D sample input weight B is plus or minus one for inside crossings. The 2-bit A/D sample sample input weight B is plus or minus five for outside crossings with an R factor of 5.

TABLE 7

PN-CODE I OR Q CORRELATOR/
INTEGRATOR TAP 88 ARITHMETIC

| S | C | CORRELATOR S XOR C = CIN | INTEGRATOR | COMMENT |
|---|---|---|---|---|
| 0 | 1 | 1 | A−B=A+BN+CIN | Mismatch |
| 0 | 0 | 0 | A+B+CIN | Match |
| 1 | 1 | 0 | A+B+CIN | Match |
| 1 | 0 | 1 | A−B=A+BN+CIN | Mismatch |

When: CIN = 0 = ADD
CIN = 1 = SUBTRACT
Where: A = Accumulator Register Output
B = BWTGX, where X is the channel number
BN = BWTGXN (the Inverted BWTGX)
S = SIGN BIT SI or SQ
C = Code reference CIXY or CQXY
X = Channel number
Y = Correlator/integrator tap number
N = Active Low Logic Note: The trailing letter convention is XYN, XY, XN, YN, X, Y, N.

Figure 12:
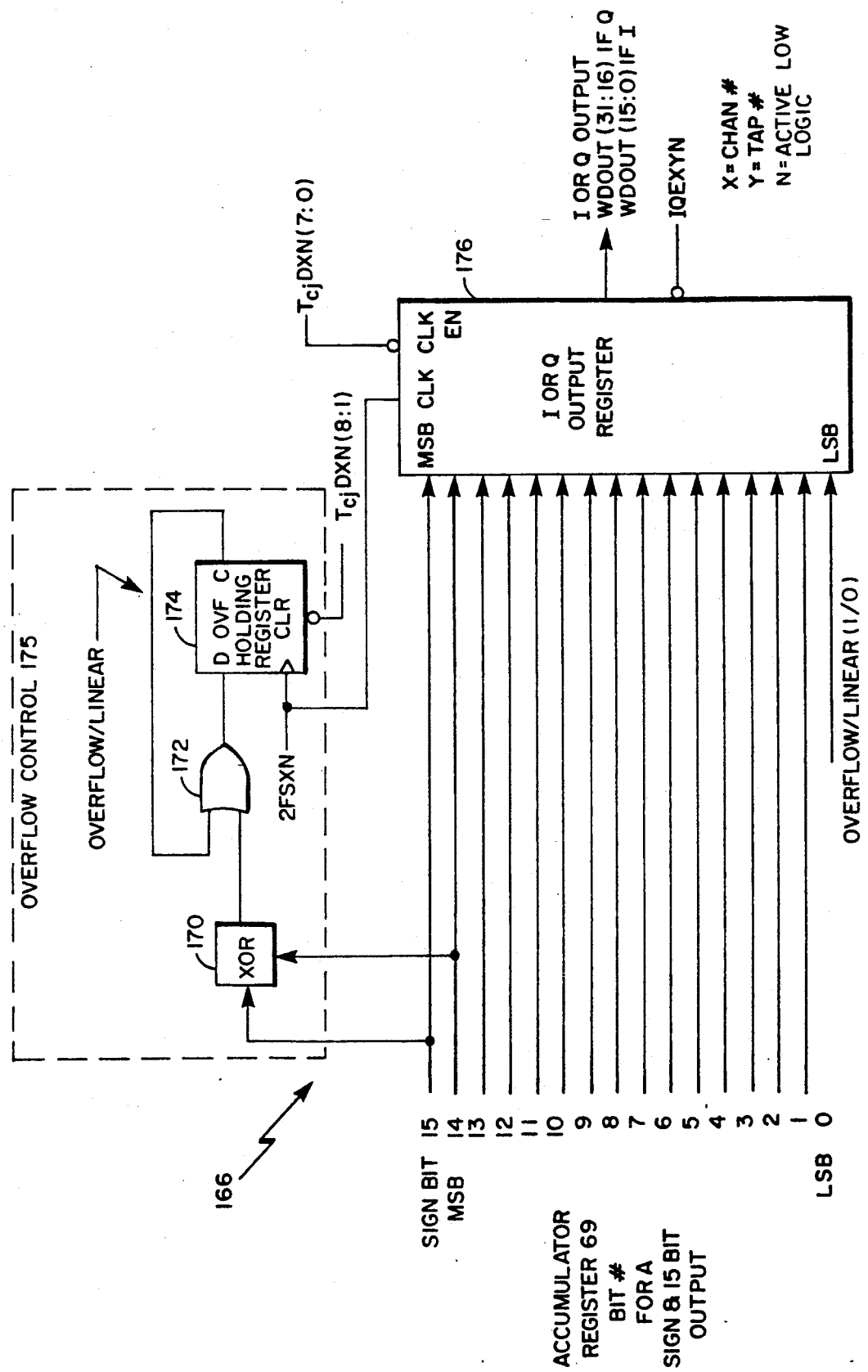
FIG. 12 is a logic diagram of one I or Q muilti-Y-tap integrator overflow control coupled to an output register which is shown in FIG. 11A as the output register/overflow control.

Referring now to FIGS. 11A, 11B and 12, each correlator/integrator tap requires two timing pulses. The timing pulses for tap 0, $T_{cj}$DXN(9) and $T_{cj}$DXN(1), are shown in FIG. 11B. For tap 0, the timing pulse $T_{cj}$DXN(0) enables the I or Q output register 176 to clock in and then hold the correlated and integrated value for the GPS processor 18 to read one I and Q 32-bit output tap word WD$_{OUT}$(31:16) and WD$_{OUT}$(15:0) at a time over the serial output port 42 shown in FIG. 3. The timing pulse $T_{cj}$DN(0) is also used to enable AND gate 164 to zero (dump) the integrated value. The accumulator register 69 on the next rising edge of the 2FSXN clock, timing pulse $T_{cj}$DN(1) is used to clear the overflow (OVF) holding register 174 for tap 0. The basic timing for each pulse $T_{cj}$DXN(8:0) and tap as shown in FIG. 4 is for ½ P-code chip spacing, which is approximately one I and Q sample clock 2FSN. The other chip spacings are controlled by the counter 54 and 4:1 MUX 55 shown in FIG. 5. The SPACEN output of the 4:1 MUX 55 is used to enable clocking the IREFX shift register 62, QREFX shift register 63, and the timing 9-bit shift register 148 (in FIG. 9). The 9-bit timing shift register 148 outputs $T_{cj}$DXN (7:0) for each correlator/integrator tap ensure that each tap correlates the same PN-code sequence for the correlation time interval $T_{cj}$ (1 ms).

Referring now to FIG. 12, a block diagram of the I or Q correlator/integrator tap output register 176 and its overflow 175 control for overflow detection is shown. The timing pulse for the correlation interval Tcj after clock delays 146 is delayed in the 9-bit shift register 148 to account for the PN-code chip spacing delays. The 9-bit shift register 148 taps TcjDXN[7:0] are used to enable the 2FSXN clock on each I or Q output register 176 tap for holding each tap integrated value for one correlation interval to the next for the GPS processor 18 to read. The 9-bit shift register taps $T_{cj}$DXN(8:1) are used to clear the overflow holding register 174 in each tap one clock pulse after capturing the correlated integrated accumulator register 69 output and the overflow holding register 174 output in the I or Q output register 176.

Figure 13:
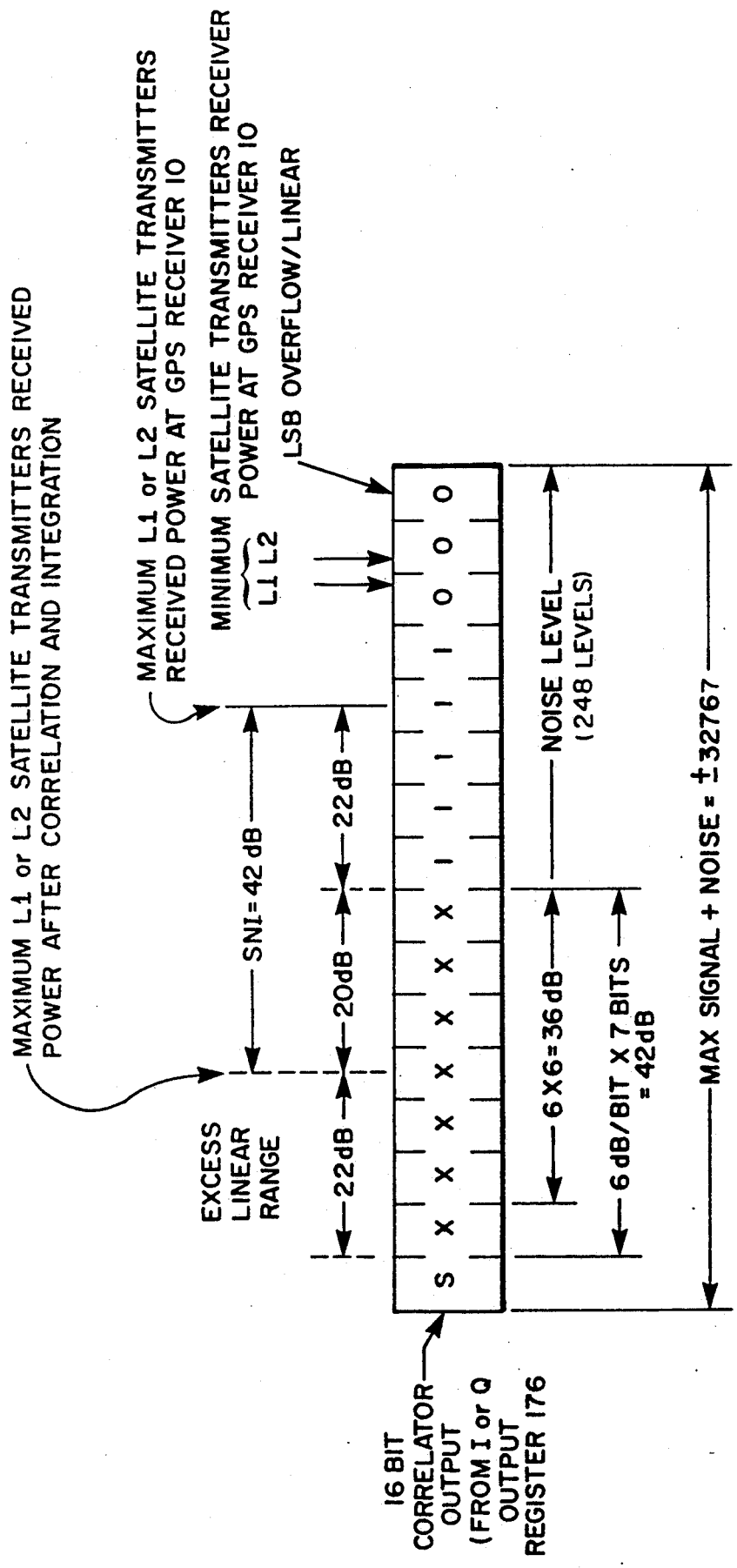
FIG. 13 shows the I or Q correlator 16-bit output levels for one I or Q Y-tap.

Referring now to FIG. 12 and FIG. 13, the I or Q integrator overflow control logic is shown in Table 8. Overflow is tested using XOR gate 170 coupled to OR-gate 172 as shown in Table 8 for each sample and latched in the OVF holding register 174 when detected. An OR-gate 172 holds any detected overflow for the remaining time of the correlation interval ($T_{cj}$). At the end of the correlation interval ($T_{cj}$), the overflow bit is clocked into I or Q output register 176 by timing pulses $T_{cj}$DXN(7:0), one for each tap and the overflow stored in holding register 174 is cleared one 2FSXN clock later for the next correlation interval by timing pulses $T_{cj}$DXN(8:1) one for each tap. Overflow/linear operation is clocked into the LSB of the output register 176 at the end of the correlation interval with the 15 MSBs of the integrator 156. With satellite PN-codes, the correlator is always linear and the LSB is equal to zero. The overflow detection is required when the correlator references CIX(7:0) and CQX(7:9) are a logic one.

output is shown for $\theta$ equal to 10 percent outside crossings of the A/D samples. Algorithms used for built-in-test and other applications use the overflow bit. The A/D I data and Q data from the GPS receiver front end 14 has doppler frequency removed by the phase rotator 32 (FIG. 3) and the PN-code stripped off by the correlator 150 (FIG. 10) and the integrator 156 (FIG. 10) integrates the correlator match or mismatched correlations defined in Table 7 to provide signal-to-noise improvement of the received PN-code modulated carrier. The maximum received power signal-to-noise at the GPS receiver 10 for the L1 and L2 satellite transmitters is −22dB. The minimum received power signal-to-noise levels for L1 is −35dB and for L2 is −38dB. The equivalent received signal-to-noise levels and the correlator/integrator output level for the maximum L1 or L2 satellite transmitters received power at the GPS receiver 10 is shown in FIG. 13. The example in FIG. 13 is for a signal-to-noise improvement (SNI) of 42dB and is for the following parameters:

R factor=5, $\theta$=10%,
2FS=23.188MHZ, I or Q sample rate
Number of I and Q samples in 1MS=23188
Hence, $$I \text{ or } Q \text{ noise} = \sqrt{23188} + \sqrt{(R-1) \times \theta \times 23188} = 248$$

$$I \text{ or } Q \text{ signal} = 23188 + (R-1) \times \theta \times 23188 = 32463$$

$$\begin{aligned} SNI &= \text{signal-to-noise improvement} \\ &= 20\text{LOG}(32463/248) = 42 \text{ dB} \end{aligned}$$

$\theta$ equals Percentage of A/D outside crossings

The X-channel signal processor 16 of the GPS receiver 10 comprising the present invention may be embodied by a complementary metal-oxide semiconductor (CMOS) very large scale integrated (VLSI) circuit chip using 1.0 micron technology. A 5-channel signal processor VLSI chip for a P-code, C/A code and an external code comprises approximately 100,000 gates. Such a chip, with its repetitive channels and large number of buses can be implemented in a cell based family gate array or sea-of-gates gate array as manufactured by Raytheon Company, of Lexington, Mass., and VLSI Technology, Inc. of San Jose, Calif. The die or chip is approximately 500 mils square dissipating less than one watt of power. The P-coder and 8-tap I and Q correlator/integrators 38, 40 for 5-channels comprises approximately 60 percent of the chip or die area. Implementing a C/A code only 5-channel receiver with a three tap I and Q correlator/integrator 38, 40 comprises approximately 60,000 gates requiring a die or chip size of approximately 400 mils square. The extended C/A code range is shown in Table 1. The signal processor 16 VLSI chip employs a serial input and output interface to reduce the number of signal pins required for the

TABLE 8

| | INTEGRATOR 156 OVERFLOW CONTROL LOGIC | | |
|---|---|---|---|
| SIGN BIT(15) | MSB BIT(14) | BIT(15) XOR BIT (14) | OUTPUT |
| 0 | 0 | 0 | ACCUMULATOR REGISTER |
| 0 | 1 | 1 | + OVERFLOW SET OUTSIDE LSB |
| 1 | 0 | 1 | − OVERFLOW SET OUTSIDE LSB |
| 1 | 1 | 0 | ACCUMULATOR REGISTER |

Referring now to FIG. 13, the I or Q noise level and linear range of the 16-bit correlator/integrator 38, 40

VLSI chip package. This provides for a wide array of packaging options including both surface mount and thruhole technologies.

The GPS receiver front end 14 may be embodied with relatively low power gallium arsenide or silicon technology as manufactured by Raytheon Company of Lexington, Mass., and Triquint Semiconductor of Beaverton, Ore. The GPS processor 18 may be embodied by an off-the-shelf single chip, CMOS, 32-bit processor as manufactured by Texas Instruments of Dallas, Tex., and Motorola of Pheonix, Ariz.

This concludes the description of the preferred embodiment. However, many modifications and alterations will be obvious to one of ordinary skill in the art without departing from the spirit and scope of the inventive concept. For example, the correlator/integrator 38, 40 may be used with a GPS receiver 10 having either baseband sampling or IF sampling in the GPS receiver front end (RFE) 14. The contents of the R factor registers 66, 67, 82 may be fixed or programmable via the GPS processor 18. The R factor values loaded into the R factor registers 66, 67, 82 result in several modes of operation comprising the equivalent processing of an N-bit to a 1-bit A/D input. Other modes of operation provide for evaluating only inside crossings, provide for a linear N-bit A/D or an adaptive N-bit A/D converter magnitude weight for outside crossings of the A/D samples. Therefore, it is intended that the scope of this invention be limited only by the appended claims.

What is claimed is:

1. A Global Positioning System receiver comprising:
   receiving means for performing sampling of a received PN-code modulated carrier to generate in-phase (I) and quadrature-phase (Q) samples;
   signal processor means coupled to outputs of said receiving means for removing a doppler frequency and PN-code modulation from said modulated carrier, said signal processor means comprises a plurality of channels, each of said channels including a correlator means, having sign and magnitude input weighting means, for correlating said I and Q samples with an in-phase (IREF) and a quadrature-phase (QREF) components of an internally generated PN-code reference, said correlator means controlled in response to a weighting select signal; and
   means coupled to said signal processor means for processing said correlated I and Q samples.

2. The Global Positioning System receiver as recited in claim 1 wherein:
   said receiving means comprises IF sampling means for generating said I and Q samples.

3. The Global Positioning System receiver as recited in claim 1 wherein:
   said receiving means comprises baseband sampling means for generating said I and Q samples.

4. The Global Positioning System receiver as recited in claim 3 wherein:
   said correlator means comprises means for correlating said I and Q samples with said IREF component of said internally generated PN-code reference.

5. The Global Positioning System receiver as recited in claim 1 wherein said sign and magnitude input weighting means of said correlator means comprises:
   register means for storing an R factor weighting input;
   multiplexor means coupled to said register means for selecting between weighted inside crossings of said samples and weighted outside crossings of said samples in accordance with said weighting select signal; and
   logic means coupled to said multiplexor means for generating said weighting select signal in accordance with sign and magnitude inputs of said samples to said logic means.

6. The Global Positioning System receiver as recited in claim 5 wherein said multiplexor means comprises:
   an I weighting multiplexor having a first input coupled to said R factor register means for selecting said weighted outside crossings, and a second input coupled to an input sample weight for selecting said weighted inside crossings; and
   a Q weighting multiplexor having a first input coupled to said R factor register means for selecting said weighted outside crossings and a second input coupled to said input sample weight for selecting said weighted inside crossings.

7. The Global Positioning System receiver as recited in claim 5 wherein said logic means comprises means for performing an exclusive-OR magnitude select logic function.

8. The Global Positioning System receiver as recited in claim 1 wherein said correlator means comprises:
   input weighting means for applying an R factor weighting for outside crossings to said samples thereby providing said weighted samples with additional A/D conversion gain for correlation;
   adder control means coupled to said input weighting means for determining whether each of said weighted samples is added to or subtracted from an accumulated value of said weighted samples in accordance with a correlator control signal;
   means for generating said correlator control signal by comparing a sign of said sample to a PN-code reference signal; and
   integrator means coupled to said adder control means and said correlator control signal generating means for accumulating and integrating said weighted samples over a correlation time interval.

9. The Global Positioning System as recited in claim 8 wherein said generating means comprises means for performing an exclusive-OR correlator control logic function.

10. The Global Positioning System receiver as recited in claim 1 wherein:
    said correlated I and Q samples processing means comprises means for providing multi-channel control signals to said signal processor means and estimating a pseudo-range and pseudo-range rate.

11. A Global Positioning System receiver comprising:
    receiving means for performing sampling of a received PN-code modulated carrier to generate in-phase (I) and quadrature-phase (Q) samples;
    signal processor means, coupled to outputs of said receiving means, having a plurality of channels, each of said channels comprising:
    (a) means for removing received carrier doppler from said in-phase (I) and quadrature-phase (Q) samples;
    (b) means for generating a PN-code reference which is a replica of said received PN-code, said PN-code reference having an in-phase (IREF) component and a quadrature-phase (QREF) component;

(c) means, coupled to said carrier doppler removing means and said PN-code reference generating means, for correlating said I and Q samples with said IREF and QREF components respectively of said replicated PN-code;

(d) said correlating means comprises sign and magnitude input weighting of said I and Q samples including an I input weighting means coupled to a plurality of means for removing said PN-code modulated on said in-phase (I) component of said received carrier, and a Q input weighting means coupled to a plurality of means for removing said PN-code modulated on said quadrature-phase (O) component of said received carrier, each of said input weighting means being controlled in accordance with a weighting select input; and means coupled to said signal processor means for processing said correlated I and Q samples to determine the phase of said carrier signals, to provide multi-channel control signals to said signal processor means and to estimate a pseudo-range and pseudo-range rate.

12. The apparatus as recited in claim 11 wherein said I input weighting means comprises a register means for storing an R factor weighting input.

13. The apparatus as recited in claim 12 wherein said R factor weighting input is variable under programmed control.

14. The apparatus as recited in claim 12 wherein said R factor weighting input is a constant for a specific correlation interval ($T_{cj}$).

15. The Global Positioning System receiver as recited in claim 11 wherein:
said receiving means comprises IF sampling means.

16. The Global Positioning System receiver as recited in claim 11 wherein:
said receiving means comprises baseband sampling means.

17. The Global Positioning system receiver as recited in claim 16 wherein:
said correlator means comprises means for correlating said I and Q samples with said IREF component of said internally generated PN-code reference.

18. A correlation apparatus comprising:
means for removing received carrier doppler from in-phase (I) and quadrature-phase (Q) samples of a received pseudo-random noise (PN) code modulated carrier signal;

means coupled to said received carrier doppler removing means for generating a PN-code reference which is a replica of said received PN-code, said PN-code reference having an in-phase (IREF) component and a quadrature-phase (QREF) component; and means, coupled to said carrier doppler removing means and said PN-code reference replica generating means, for correlating said I and Q samples with said IREF and QREF components respectively of said replicated PN-code.

19. The correlation apparatus as recited in claim 18 wherein said correlating means comprises sign and magnitude input weighting of said I and Q samples.

20. The correlation apparatus as recited in claim 19 wherein said sign and magnitude input weighting comprises:
register means for storing an R factor weighting input;

multiplexor means coupled to said register means for selecting between weighted inside crossings of said samples and weighted outside crossings of said samples in accordance with said weighting select signal; and logic means coupled to said multiplexor means for generating said weighting select signal in accordance with sign and magnitude inputs of said samples to said logic means.

21. The correlation apparatus as recited in claim 20 wherein said logic means comprises means for performing an exclusive-OR magnitude select logic function.

22. The correlation apparatus as recited in claim 18 wherein said correlating means comprises:
input weighting means for applying an R factor weighting for outside crossings to said samples thereby providing said weighted samples with additional A/D conversion gain for correlation;

adder control means coupled to said input weighting means for determining whether each of said weighted samples is added to or subtracted from an accumulated value of said weighted samples in accordance with a correlator control signal;

means for generating said correlator control signal by comparing a sign of said I or Q sample to a PN-code reference signal; and integrator means coupled to said adder control means and said correlator control signal generating means for accumulating and integrating said weighted samples over a correlation time interval.

23. The correlation apparatus as recited in claim 21 wherein said generating means comprises means for performing an exclusive-OR correlator control logic function.

24. The correlation apparatus as recited in claim 18 wherein:
said correlating means comprises an I input weighting means coupled to a plurality of means for removing said PN-code modulated on said in-phase (I) component of said received carrier, and a Q input weighting means coupled to a plurality of means for removing said PN-code modulated on said quadrature-phase (Q) component of said received carrier, each of said input weighting means being controlled in accordance with a weighting select input.

25. The correlation apparatus as recited in claim 24 wherein said I input weighting means comprises a register means for storing an R factor weighting input.

26. The correlation apparatus as recited in claim 25 wherein said R factor weighting input is variable under programmed control.

27. The correlation apparatus as recited in claim 25 wherein said R factor weighting input is a constant for a specific correlation interval ($T_{cj}$).

28. The correlation apparatus as recited in claim 24 wherein said correlating means comprises logic means for generating said weighting select input in accordance with sign and magnitude inputs of said I samples provided to a first of said logic means coupled to said I input weighting means and sign and magnitude inputs of said Q samples provided to a second of said logic means coupled to said Q input weighting means.

29. A method for performing PN-code correlation in a Global Positioning System receiver comprising the steps of:

sampling a received PN-code modulated carrier in a receiver means to generate in-phase (I) and quadrature-phase (Q) samples;

removing a doppler frequency and PN-code modulation from said modulated carrier in a signal processor means, said signal processor means comprises a plurality of channels, each of said channels including a correlator means having sign and magnitude input weighting means;

correlating in said correlator means said weighted I and Q samples with in-phase (IREF) and quadrature-phase (QREF) components of an internally generated PN-code reference; and processing said correlated I and Q samples in a processor means.

30. The method as recited in claim 29 wherein said step of said sampling in a receiver means includes said receiver means performing IF sampling for generating said I and Q samples.

31. The method as recited in claim 29 wherein said step of sampling in a receiver means includes said receiver means performing baseband sampling for generating said I and Q samples.

32. The method as recited in claim 31 wherein said step of correlating further comprises the step of correlating said weighted I and Q samples with only said IREF component of said internally generated PN-code reference when performing said baseband sampling in said receiver means.

33. A method of performing correlation comprising the steps of:

removing received carrier doppler from in-phase (I) and quadrature-phase (Q) samples of a received pseudo-random noise (PN) code modulated carrier signal;

generating a PN-code reference which is a replica of said received PN-code, said PN-code reference having an in-phase (IREF) component and a quadrature-phase (QREF) component; and correlating said I and Q samples with said IREF and QREF components respectively of said replicated PN-code.

34. The method as recited in claim 33 wherein said step of correlating said I and Q samples with said IREF and QREF components comprises coupling an I input weighting means to a plurality of means for removing said PN-code modulated on said in-phase (I) component of said received carrier, and coupling a Q input weighting means to a plurality of means for removing said PN-code modulated on said quadrature-phase (Q) component of said received carrier, each of said I or Q input weighting means being controlled in accordance with and I or Q weighting select input.

35. The method as recited in claim 34 wherein said correlating step further comprises the step of providing a variable R factor weighting value under programmed control.

36. The method as recited in claim 34 wherein said correlating step further comprises the step of providing a constant R factor weighting value for a specific correlation interval ($T_{cj}$).

37. A radio receiver comprising:

receiving means for performing sampling of a received PN-code modulated carrier to generate in-phase (I) and quadrature-phase (Q) samples; and signal processor means coupled to outputs of said receiving means for removing a doppler frequency and PN-code modulation from said modulated carrier, said signal processor means comprises a plurality of channels, each of said channels including a correlator means, having sign and magnitude input weighting means, for correlating said I and Q samples with an in-phase (IREF) and a quadrature-phase (QREF) components of an internally generated PN-code reference, said correlator means controlled in response to a weighting select signal.

38. The radio receiver as recited in claim 37 wherein: said receiving means comprises IF sampling means for generating said I and Q samples.

39. The radio receiver as recited in claim 37 wherein: said receiving means comprises baseband sampling means for generating said I and Q samples.

40. The radio receiver as recited in claim 39 wherein: said correlator means comprises means for correlating said I and Q samples with said IREF component of said internally generated PN-code reference.

41. The radio receiver as recited in claim 37 wherein said sign and magnitude input weighting means of said correlator means comprises:

register means for storing an R factor weighting input;

multiplexor means coupled to said register means for selecting between weighted inside crossings of said samples and weighted outside crossings of said samples in accordance with said weighting select signal; and logic means coupled to said multiplexor means for generating said weighting select signal in accordance with sign and magnitude inputs of said samples to said logic means.

42. The radio receiver as recited in claim 41 wherein said multiplexor means comprises:

an I weighting multiplexor having a first input coupled to said R factor register means for selecting said weighted outside crossings, and a second input coupled to an input sample weight for selecting said weighted inside crossings; and a Q weighting multiplexor having first input coupled to said R factor register means for selecting said weighted outside crossings and a second input coupled to said input sample weight for selecting said weighted inside crossings.

43. A method for performing PN-code correlation in a radio receiver comprising the steps of:

sampling a received PN-code modulated carrier in a receiver means to generate in-phase (I) and quadrature-phase (Q) samples;

removing a doppler frequency and PN-code modulation from said modulated carrier in a signal processor means, said signal processor means comprises a plurality of channels, each of said channels including a correlator means having sign and magnitude input weighting means; and correlating in said correlator means said weighted I and Q samples with in-phase (IREF) and quadrature-phase (QREF) components of an internally generated PN-code reference.

44. The method as recited in claim 43 wherein said step of said sampling in a receiver means includes said receiver means performing IF sampling for generating said I and Q samples.

45. The method as recited in claim 43 wherein said step of sampling in a receiver means includes said receiver means performing baseband sampling for generating said I and Q samples.

46. The method as recited in claim 45 wherein said step of correlating further comprises the step of correlating said weighted I and Q samples with only said IREF component of said internally generated PN-code reference when performing said baseband sampling in said receiver means.

* * * * *